US009930299B2

(12) United States Patent
Modestine et al.

(10) Patent No.: US 9,930,299 B2
(45) Date of Patent: Mar. 27, 2018

(54) VIDEO ON DEMAND FOR AUDIO/VIDEO RECORDING AND COMMUNICATION DEVICES

(71) Applicant: BOT HOME AUTOMATION, INC., Santa Monica, CA (US)

(72) Inventors: John Modestine, Los Angeles, CA (US); Joshua Roth, Pacific Palisades, CA (US)

( * ) Notice: Subject to any disclaimer, the term of this patent is extended or adjusted under 35 U.S.C. 154(b) by 0 days.

(21) Appl. No.: 15/380,044

(22) Filed: Dec. 15, 2016

(65) Prior Publication Data

US 2017/0171516 A1    Jun. 15, 2017

Related U.S. Application Data

(60) Provisional application No. 62/267,762, filed on Dec. 15, 2015, provisional application No. 62/289,114, filed on Jan. 29, 2016.

(51) Int. Cl.
*H04N 7/18* (2006.01)
*G08B 13/196* (2006.01)
*H04N 5/77* (2006.01)

(52) U.S. Cl.
CPC ....... *H04N 7/186* (2013.01); *G08B 13/19656* (2013.01); *G08B 13/19669* (2013.01); *G08B 13/19689* (2013.01); *H04N 5/77* (2013.01)

(58) Field of Classification Search
CPC combination set(s) only.
See application file for complete search history.

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 | 11/2002 |
| CN | 2792061 | 11/2004 |

(Continued)

OTHER PUBLICATIONS

Ness Corporation. Ness IP Video Intercom Installation and Users Manual, Version 1.3. (60 pages).

(Continued)

*Primary Examiner* — Joseph J Nguyen
*Assistant Examiner* — Phung-Hoang J Nguyen

(57) ABSTRACT

In a battery-powered audio/video recording and communication device having a camera, the length of a preset interval (the interval between instances of the device sending a request to a network to check whether any user requests to access the camera have been received) may be adjusted upward or downward in order to balance the competing interests of reducing latency (e.g. reducing the delay that the user may experience when trying to access the camera) and conserving battery life. The present embodiments advantageously balance these competing interests by initially setting the length of the preset interval to be relatively short to reduce latency, but automatically increasing the length of the preset interval as the battery charge is depleted, thereby extending battery life. The present embodiments also advantageously enable the length of the preset interval to be increased after the battery is recharged, thereby reducing latency.

22 Claims, 20 Drawing Sheets

(56) References Cited

U.S. PATENT DOCUMENTS

| | | | |
|---|---|---|---|
| 5,760,848 A | 6/1998 | Cho | |
| 6,072,402 A | 6/2000 | Kniffi N et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,489,065 B2 | 7/2013 | Green et al. | |
| 8,619,136 B2 | 12/2013 | Howarter et al. | |
| 8,675,063 B2 | 3/2014 | Bentkovski | |
| 8,780,201 B1 * | 7/2014 | Scalisi | H04N 7/186 348/143 |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi et al. | |
| 8,947,530 B1 | 2/2015 | Scalisi | |
| 8,953,040 B1 | 2/2015 | Scalisi et al. | |
| 8,964,113 B2 | 2/2015 | Kannermark et al. | |
| 9,013,575 B2 | 4/2015 | Scalisi | |
| 9,019,371 B2 | 4/2015 | Hutchings | |
| 9,049,352 B2 | 6/2015 | Scalisi et al. | |
| 9,053,622 B2 | 6/2015 | Scalisi | |
| 9,055,202 B1 | 6/2015 | Scalisi et al. | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,109,378 B2 | 8/2015 | Scalisi | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,058 B1 | 11/2015 | Zeira et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,282,182 B2 | 3/2016 | Wakeyama et al. | |
| 9,342,936 B2 | 5/2016 | Scalisi | |
| 9,508,239 B1 | 11/2016 | Harrison et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0070107 A1 | 3/2006 | Renkis | |
| 2006/0139449 A1 | 6/2006 | Cheng et al. | |
| 2006/0156361 A1 | 7/2006 | Wang et al. | |
| 2008/0036862 A1 | 2/2008 | Lang et al. | |
| 2008/0068150 A1 | 3/2008 | Nguyen et al. | |
| 2010/0235664 A1 | 9/2010 | Karlsson | |
| 2011/0193697 A1 | 8/2011 | Albert et al. | |
| 2012/0098970 A1 | 4/2012 | Amini et al. | |
| 2012/0113253 A1 | 5/2012 | Slater | |
| 2012/0149344 A1 | 6/2012 | Dasgupta | |
| 2012/0233293 A1 * | 9/2012 | Barton | H04L 67/06 709/219 |
| 2012/0291068 A1 | 11/2012 | Khushoo et al. | |
| 2013/0057695 A1 | 3/2013 | Huisking | |
| 2014/0070922 A1 | 3/2014 | Davis | |
| 2014/0098227 A1 | 4/2014 | Chen et al. | |
| 2014/0125754 A1 | 5/2014 | Haywood | |
| 2015/0022618 A1 | 1/2015 | Siminoff | |
| 2015/0022620 A1 | 1/2015 | Siminoff | |
| 2015/0160636 A1 | 6/2015 | McCarthy, III et al. | |
| 2015/0237252 A1 | 8/2015 | O'Donnell et al. | |
| 2016/0105644 A1 * | 4/2016 | Smith | H04N 5/23206 348/159 |
| 2016/0134811 A1 | 5/2016 | Watanabe et al. | |
| 2016/0134932 A1 | 5/2016 | Karp et al. | |
| 2016/0359340 A1 * | 12/2016 | Zhao | H02J 7/045 |

FOREIGN PATENT DOCUMENTS

| | | |
|---|---|---|
| CN | 104244106 A | 12/2014 |
| EP | 0944883 B1 | 2/1997 |
| EP | 1480462 A1 | 11/2004 |
| GB | 2286283 A | 8/1995 |
| GB | 2354394 A | 9/1999 |
| GB | 2354394 A | 3/2001 |
| GB | 2357387 A | 6/2001 |
| GB | 2400958 A | 10/2004 |
| JP | 2001-103463 | 4/2001 |
| JP | 2002-033839 | 1/2002 |
| JP | 2002-125059 | 4/2002 |
| JP | 2002-342863 | 11/2002 |
| JP | 2002-344640 | 11/2002 |
| JP | 2002-354137 | 12/2002 |
| JP | 2002-368890 | 12/2002 |
| JP | 2003-283696 | 10/2003 |
| JP | 2004-128835 | 4/2004 |
| JP | 2005-341040 | 12/2005 |
| JP | 2006-147650 | 6/2006 |
| JP | 2006-262342 | 9/2006 |
| JP | 2009-008925 | 1/2009 |
| WO | 9839894 | 9/1998 |
| WO | 0113638 A1 | 2/2001 |
| WO | 0193220 A1 | 12/2001 |
| WO | 32085019 A1 | 10/2002 |
| WO | 03028375 A1 | 4/2003 |
| WO | 06038760 A1 | 4/2006 |
| WO | 2006067782 A1 | 6/2006 |
| WO | 03096696 A2 | 9/2006 |
| WO | 2007125143 A1 | 11/2007 |
| WO | 2014144628 A2 | 9/2014 |

OTHER PUBLICATIONS

Abus Security Tech Germany. Eycasa Door & House Wireless Video System User Guide, Version Dec. 2013, English translation. (46 pages).

Mobotix, The Hires Video Company, MOBOTIX App. Compact Guide, Background Information and Practical Examples for the MOBOTIX App. (37 pages).

(56) References Cited

OTHER PUBLICATIONS

Doss Security. Handsfree AudioNideo Door Phone with Surface Mount CCD Camera. DHF72PC. Installation and Operation Manual. 2013. www.doss.com.au. (23 pages).
Department of Computer Science and Engineering. The University of Texas at Arlington. Always Home. Jan. 20, 2014 (65 pages).
Seco-Larm. Enforcer Video Manual DP-121Q Video Door Phone. (12 pages).
Seco-Larm. Enforcer Wireless Video Door Phone Manual DP-236Q. (12 pages).
Bticino. D45 System. System Technical Guide 2011. Release Sep. 1, 2011. (156 pages).
Hwang, Il-Kyu; Baek, Jin-Wook. Wireless Access Monitoring and Control System based on Digital Door Lock. IEEE Transactions on Consumer Electronics, vol. 53, No. 4. Nov. 2007. (7 pages).
Oh, Yeon-Joo; Paik, Eui-Hyun; Park, Kwang-Roh. Design of a SIP-based Real-time Visitor Communication and Door Control Architecture using a Home Gateway. IEEE Transactions on Consumer Electronics, vol. 52. No. 4. Nov. 2006. (5 pages).
Panasonic. Operating Instructions. Video Intercom System Model No. VL-SV3OBX; Main Monitor Model No. VL-MV30BX 2010. (32 pages).
Seco-Larm. Enforcer Hands-Free Video Door Phone Manual DP-234Q. (8 pages).
Seco-Larm. Enforcer Hands-Free Video Door Phone Manual DP-234Q (NTSC) and SP-734Q (PAL). (4 pages).
Swann. Advanced-Series. Doorphone Video Intercom. Colour Camera with 3.5" LCD Screen MDP870C210113E (2013) (8 pages).
Uygun. The World Going Mobile. SmartDoorbell Application. Functional Specification. IT Carlow. Dec. 13, 2010. (12 pages).
Commax. SmartHome & Security. Color Video Door Phone CDV-70U. User Manual. (2012) (14 pages).
Commax. Blooming Life Home Network. Color Video Door Phone. Model No. CDV-71BQ/71BQS. (2007) (11 pages).
Killeen Peter; Monkus, John; Klessing Biz; Hearn, D.; Wu, Jingxian; and Smith, Scott C. Department of Electrical Engineering, University of Arkansas, Department of Computer Science, Mississippi Valley State University. Developing a Smart Home System. The 2011 International Conference on Embedded Systems and Applications (2011) (7 pages).
Vtech, Complete User's Manual. Models:IS7121/IS7121-2/IS7121-22 (2013) (118 pages).
International Application No. PCT/US16166938; International Filing Date: Dec. 15, 2016. Notification of Transmittal of the International Search Report and The Written Opinion of the International Searching Authority, or the Declaration. dated Mar. 13, 2017. (15 pages).
International Application No. PCT/US16/66949; International Filing Date: Dec. 15, 2016. Notification of Transmittal of the International Search Report and the Written Opinion of the International Searching Authority, or the Declaration. dated Mar. 22, 2017. (13 pages).

\* cited by examiner

VIDEO ON DEMAND FOR AUDIO/VIDEO RECORDING AND COMMUNICATION DEVICES

CROSS-REFERENCE TO RELATED APPLICATIONS

This application claims priority to provisional application Ser. No. 62/289,114, filed on Jan. 29, 2016 and provisional application Ser. No. 62/267,762, filed on Dec. 15, 2015, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that from time to time it may be advantageous for a user to be able to remotely access the camera of his or her A/V recording and communication device(s). Such functionality would enable the user to observe remotely any events taking place in the field of view of the camera, thereby enhancing the security provided by the A/V recording and communication device(s).

In a first aspect, a method is provided for an audio/video (A/V) recording and communication device, the device including a processor and a camera, the method comprising the processor transitioning from a low-power state to an active state, and then sending a data request to a network device to determine whether a user request to access the camera has been received by the network device; if a user request to access the camera has been received by the network device, then the processor receiving a positive response from the network device, and then the camera capturing video images from a field of view of the camera; and if no user request to access the camera has been received by the network device, then the processor receiving a negative response from the network device, and then the processor reverting from the active state to the low-power state.

In an embodiment of the first aspect, the method further comprises, if no user request to access the camera has been received by the network device, the processor waiting, after reverting from the active state to the low-power state, for an interval, and then the processor again transitioning from the low-power state to the active state, and then sending another data request to the network device to determine whether a user request to access the camera has been received by the network device.

In another embodiment of the first aspect, the interval is 10 seconds.

In another embodiment of the first aspect, the device further includes a battery, and the method further comprises the processor receiving a command from the network device to adjust a length of the interval based on an amount of charge left in the battery.

In another embodiment of the first aspect, the command instructs the processor to increase the length of the interval if the amount of charge left in the battery is below a threshold value.

In another embodiment of the first aspect, the command instructs the processor to decrease the length of the interval if the amount of charge left in the battery is above a threshold value.

In another embodiment of the first aspect, the method further comprises, if a user request to access the camera has been received by the network device, the device transmitting the video images to the network.

In another embodiment of the first aspect, the method further comprises, if a user request to access the camera has been received by the network device, the camera powering up from a dormant state or powered-off state prior to capturing the video images from the field of view of the camera.

In another embodiment of the first aspect, the network device is a server.

In another embodiment of the first aspect, the data request is a Hypertext Transfer Protocol (HTTP) get.

In another embodiment of the first aspect, the positive response from the network device comprises a HTTP 200 status code.

In another embodiment of the first aspect, the negative response from the network device comprises a HTTP 404 status code.

In another embodiment of the first aspect, the device is a doorbell.

In a second aspect, an audio/video (A/V) recording and communication device is provided, the device comprising a processor; and a camera; wherein the processor is configured to execute instructions whereby the processor transitions from a low-power state to an active state, and then sends a data request to a network device to determine whether a user request to access the camera has been received by the network device; if a user request to access the camera has been received by the network device, then the processor receives a positive response from the network device, and then the camera captures video images from a field of view of the camera; and if no user request to access the camera has been received by the network device, then the processor receives a negative response from the network device, and then the processor reverts from the active state to the low-power state.

In an embodiment of the second aspect, the processor is further configured to execute instructions whereby, if no user request to access the camera has been received by the network device, the processor waits, after reverting from the active state to the low-power state, for an interval, and then the processor again transitions from the low-power state to the active state, and then sends another data request to the network device to determine whether a user request to access the camera has been received by the network device.

In another embodiment of the second aspect, the interval is 10 seconds.

In another embodiment of the second aspect, the device further includes a battery, and the method further comprises the processor receiving a command from the network device to adjust a length of the interval based on an amount of charge left in the battery.

In another embodiment of the second aspect, the command instructs the processor to increase the length of the interval if the amount of charge left in the battery is below a threshold value.

In another embodiment of the second aspect, the command instructs the processor to decrease the length of the interval if the amount of charge left in the battery is above a threshold value.

In another embodiment of the second aspect, the processor is further configured to execute instructions whereby, if a user request to access the camera has been received by the network device, the device transmits the video images to the network.

In another embodiment of the second aspect, the processor is further configured to execute instructions whereby, if a user request to access the camera has been received by the network device, the camera powers up from a dormant state or powered-off state prior to capturing the video images from the field of view of the camera.

In another embodiment of the second aspect, the network device is a server.

In another embodiment of the second aspect, the data request is a Hypertext Transfer Protocol (HTTP) get.

In another embodiment of the second aspect, the positive response from the network device comprises a HTTP 200 status code.

In another embodiment of the second aspect, the negative response from the network device comprises a HTTP 404 status code.

In another embodiment of the second aspect, the device is a doorbell.

In a third aspect, a method is provided for an audio/video (A/V) recording and communication device, the device including a processor, a camera, and a battery, the method comprising the processor transitioning from a low-power state to an active state, and then sending a data request to a network device to determine whether a user request to access the camera has been received by the network device; if a user request to access the camera has been received by the network device, then the processor receiving a positive response from the network device, and then the camera capturing video images from a field of view of the camera; if no user request to access the camera has been received by the network device, then the processor receiving a negative response from the network device, and then the processor reverting from the active state to the low-power state, and then waiting for an interval, and then the processor again transitioning from the low-power state to the active state, and then sending another data request to the network device to determine whether a user request to access the camera has been received by the network device; and the processor receiving a command from the network device to adjust a length of the interval based on an amount of charge left in the battery.

In an embodiment of the third aspect, the interval is 10 seconds.

In another embodiment of the third aspect, the command instructs the processor to increase the length of the interval if the amount of charge left in the battery is below a threshold value.

In another embodiment of the third aspect, the command instructs the processor to decrease the length of the interval if the amount of charge left in the battery is above a threshold value.

Another embodiment of the third aspect further comprises, if a user request to access the camera has been received by the network device, the device transmitting the video images to the network.

Another embodiment of the third aspect further comprises, if a user request to access the camera has been received by the network device, the camera powering up from a dormant state or powered-off state prior to capturing the video images from the field of view of the camera.

In another embodiment of the third aspect, the network device is a server.

In another embodiment of the third aspect, the data request is a Hypertext Transfer Protocol (HTTP) get.

In another embodiment of the third aspect, the positive response from the network device comprises a HTTP 200 status code.

In another embodiment of the third aspect, the negative response from the network device comprises a HTTP 404 status code.

In another embodiment of the third aspect, the device is a doorbell.

In a fourth aspect, an audio/video (A/V) recording and communication device is provided, the device comprising a processor; a camera; and a battery; wherein the processor is configured to execute instructions whereby the processor transitions from a low-power state to an active state, and then sends a data request to a network device to determine whether a user request to access the camera has been received by the network device; if a user request to access the camera has been received by the network device, then the processor receives a positive response from the network device, and then the camera captures video images from a field of view of the camera; if no user request to access the camera has been received by the network device, then the processor receives a negative response from the network device, and then the processor reverts from the active state to the low-power state, and then the processor waits for an interval, and then the processor again transitions from the low-power state to the active state, and then sends another data request to the network device to determine whether a user request to access the camera has been received by the network device; and the processor then receives a command from the network device to adjust a length of the interval based on an amount of charge left in the battery.

In an embodiment of the fourth aspect, the interval is 10 seconds.

In another embodiment of the fourth aspect, the command instructs the processor to increase the length of the interval if the amount of charge left in the battery is below a threshold value.

In another embodiment of the fourth aspect, the command instructs the processor to decrease the length of the interval if the amount of charge left in the battery is above a threshold value.

In another embodiment of the fourth aspect, the processor is further configured to execute instructions whereby, if a user request to access the camera has been received by the network device, the device transmits the video images to the network.

In another embodiment of the fourth aspect, the processor is further configured to execute instructions whereby, if a user request to access the camera has been received by the network device, the camera powers up from a dormant state or powered-off state prior to capturing the video images from the field of view of the camera.

In another embodiment of the fourth aspect, the network device is a server.

In another embodiment of the fourth aspect, the data request is a Hypertext Transfer Protocol (HTTP) get.

In another embodiment of the fourth aspect, the positive response from the network device comprises a HTTP 200 status code.

In another embodiment of the fourth aspect, the negative response from the network device comprises a HTTP 404 status code.

In another embodiment of the fourth aspect, the device is a doorbell.

BRIEF DESCRIPTION OF THE DRAWINGS

The various embodiments of the present audio/video (A/V) recording and communication devices now will be discussed in detail with an emphasis on highlighting the advantageous features. These embodiments depict the novel and non-obvious A/V recording and communication devices shown in the accompanying drawings, which are for illustrative purposes only. These drawings include the following figures, in which like numerals indicate like parts.

DETAILED DESCRIPTION

Figure 1:
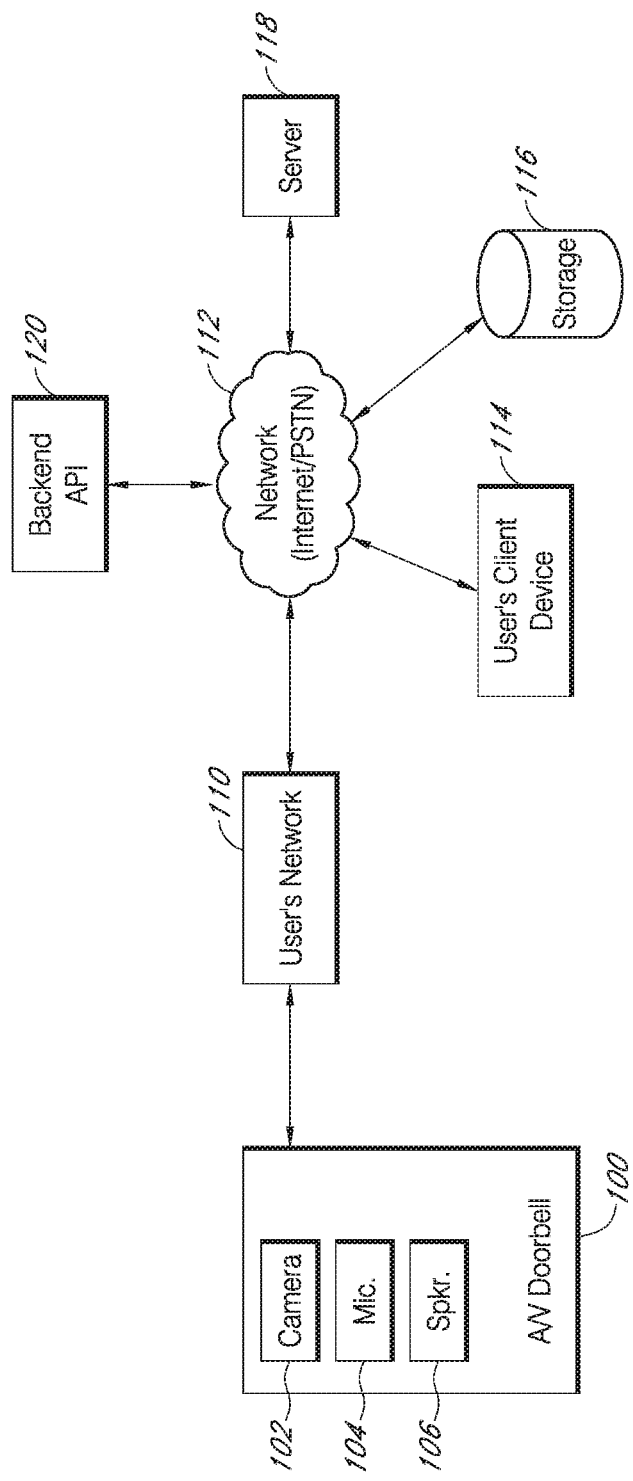
FIG. 1 is a functional block diagram illustrating a system for streaming and storing A/V content captured by an A/V recording and communication device according to the present embodiments.

The following detailed description describes the present embodiments with reference to the drawings. In the drawings, reference numbers label elements of the present embodiments. These reference numbers are reproduced below in connection with the discussion of the corresponding drawing features.

The embodiments of the A/V recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 1080p or better. While not shown, the A/V recording and communication device 100 may also include other hardware and/or components, such as a housing, a communication module (which may facilitate wired and/or wireless communication with other devices), one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
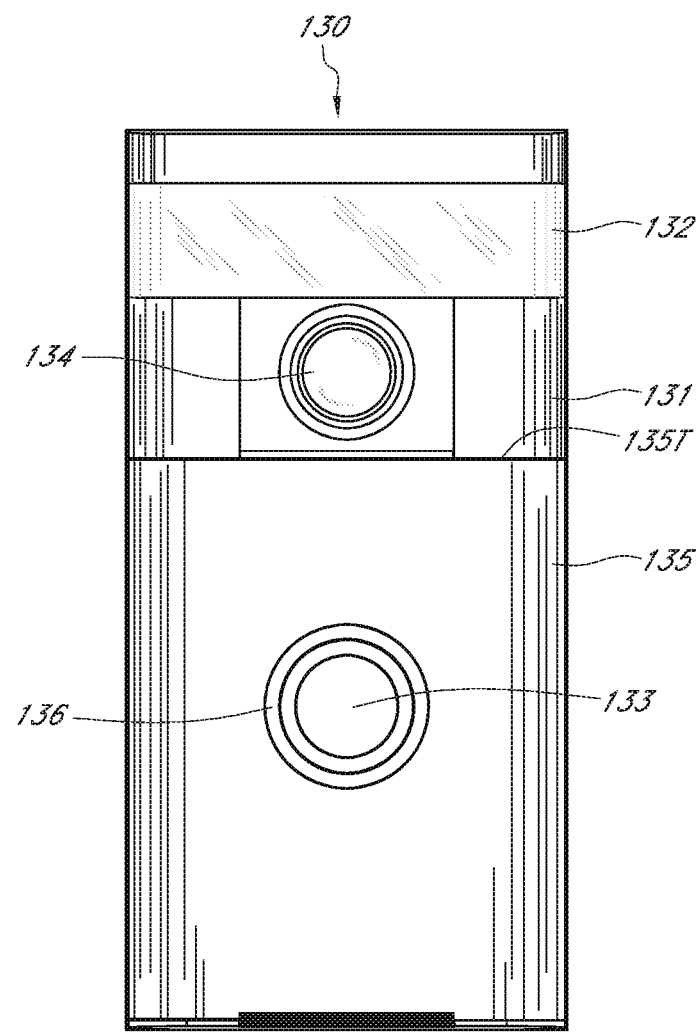
FIG. 2 is a front view of an A/V recording and communication doorbell according to an aspect of the present disclosure.
Figure 3:
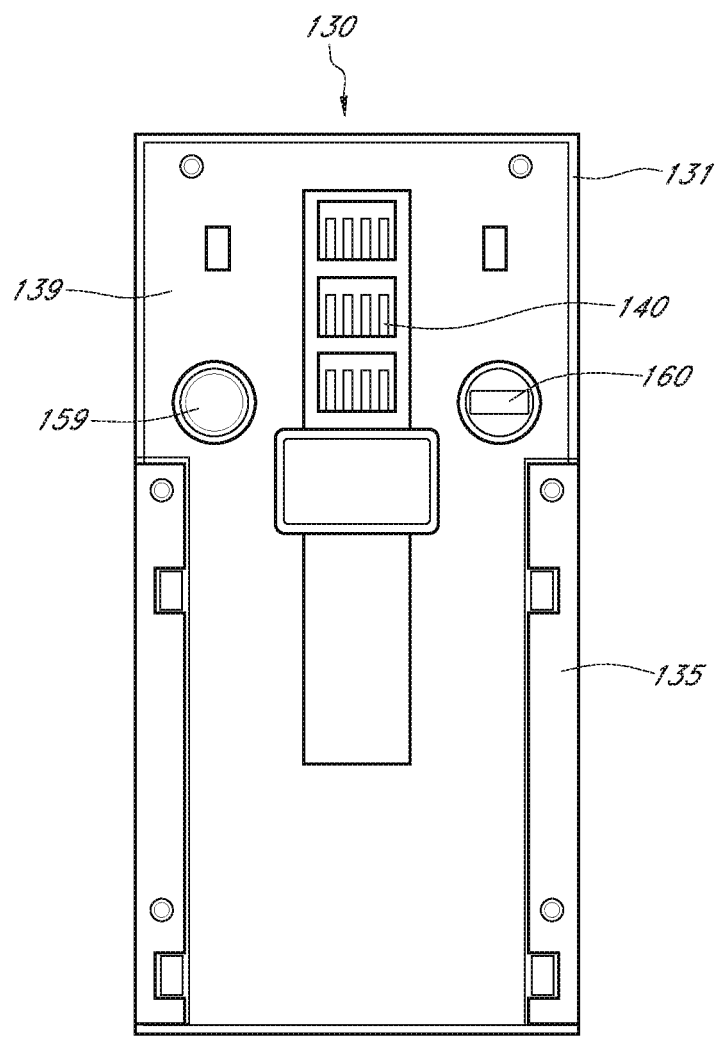
FIG. 3 is a rear view of the A/V recording and communication doorbell of FIG. 2.
Figure 4:
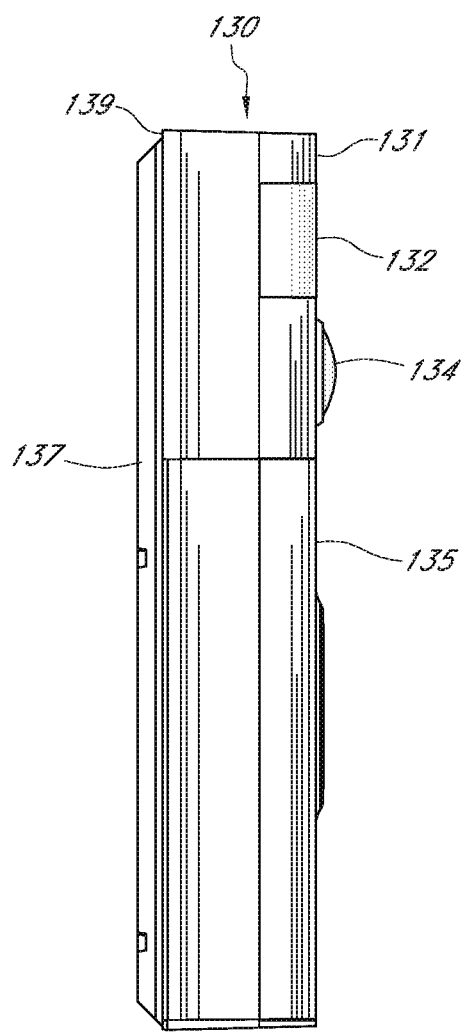
FIG. 4 is a left side view of the A/V recording and communication doorbell of FIG. 2 attached to a mounting bracket according to an aspect of the present disclosure.

FIGS. 2-4 illustrate an audio/video (A/V) communication doorbell 130 according to an aspect of present embodiments. FIG. 2 is a front view, FIG. 3 is a rear view, and FIG. 4 is a left side view of the doorbell 130 coupled with a mounting bracket 137. The doorbell 130 includes a faceplate 135 mounted to a back plate 139 (FIG. 3). With reference to FIG. 4, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 2, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 2 and 4, the doorbell 130 further includes an enclosure 131 that engages the faceplate 135. In the illustrated embodiment, the enclosure 131 abuts an upper edge 135T (FIG. 2) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 3 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 3, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 4 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 4, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 5:
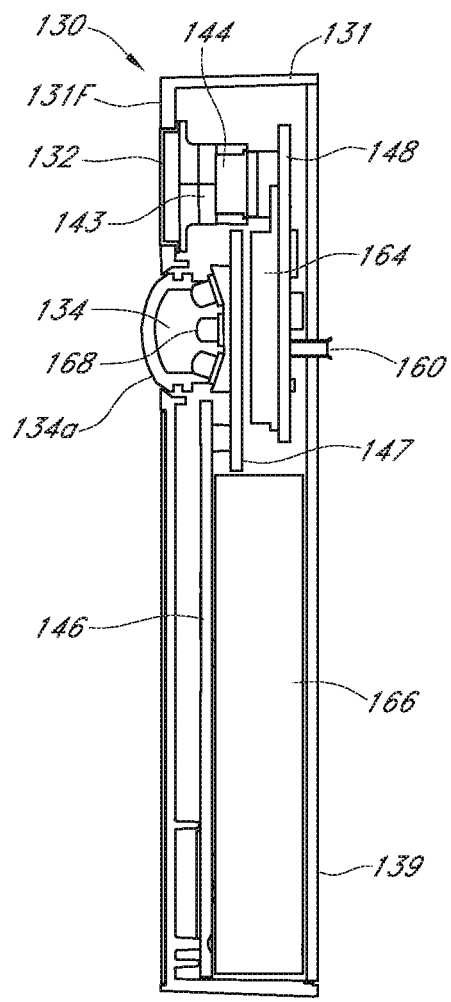
FIG. 5 is cross-sectional right side view of the A/V recording and communication doorbell of FIG. 2.

FIG. 5 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 5, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions.

With continued reference to FIG. 5, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 5, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 6:
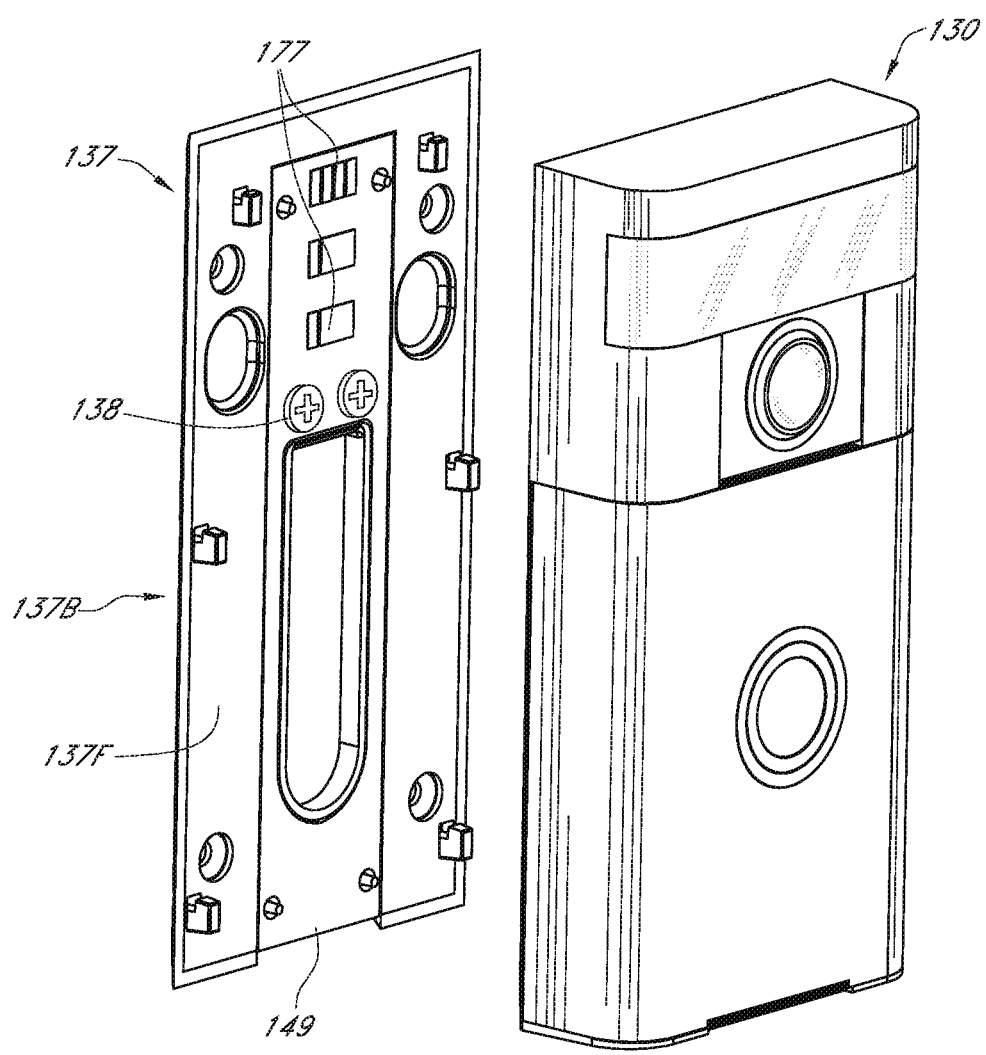
FIG. 6 is an exploded view of the A/V recording and communication doorbell and the mounting bracket of FIG. 4.

FIG. 6 is an exploded view of the doorbell 130 and the mounting bracket 137 according to an aspect of the present embodiments. The mounting bracket 137 is configured to be mounted to a mounting surface (not shown) of a structure, such as a home or an office. FIG. 6 shows the front side 137F of the mounting bracket 137. The mounting bracket 137 is configured to be mounted to the mounting surface such that the back side 137B thereof faces the mounting surface. In certain embodiments the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 6, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 7:
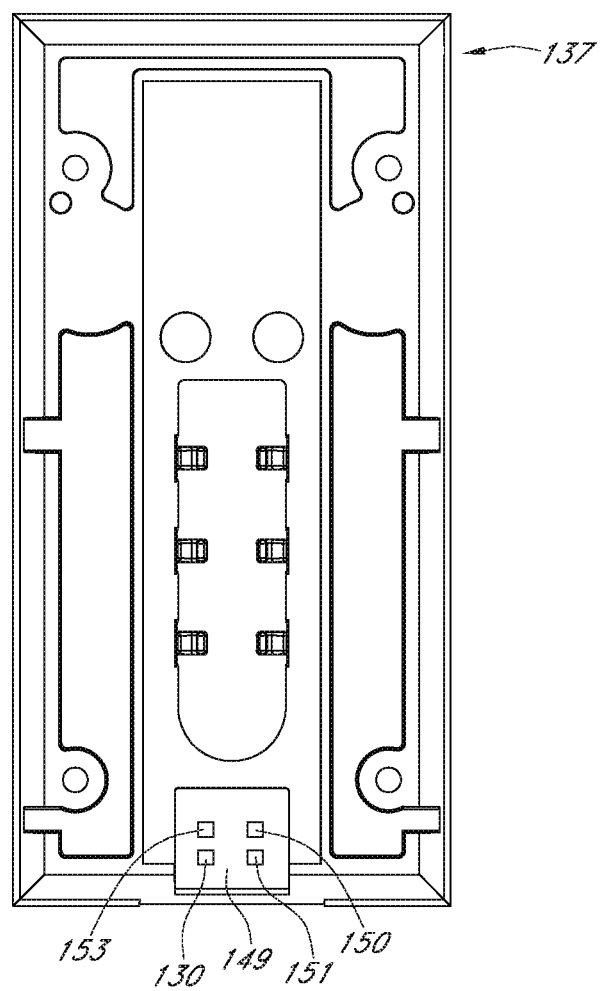
FIG. 7 is a rear view of the mounting bracket of FIG. 4.

With reference to FIGS. 6 and 7 (which is a rear view of the mounting bracket 137), the mounting bracket 137 further comprises a bracket PCB 149. With reference to FIG. 7, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 8A:
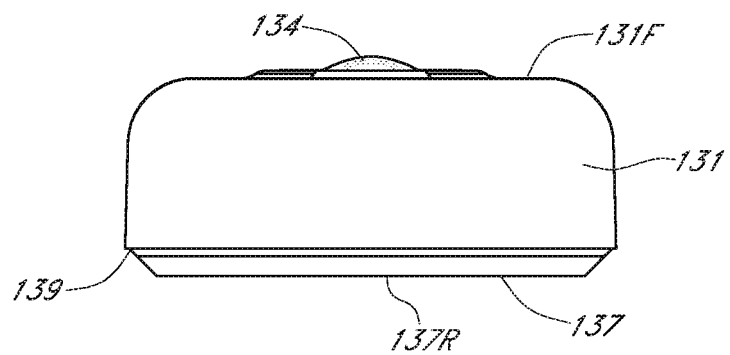
FIGS. 8A and 8B are top and bottom views, respectively, of the A/V recording and communication doorbell and the mounting bracket of FIG. 4.
Figure 8B:
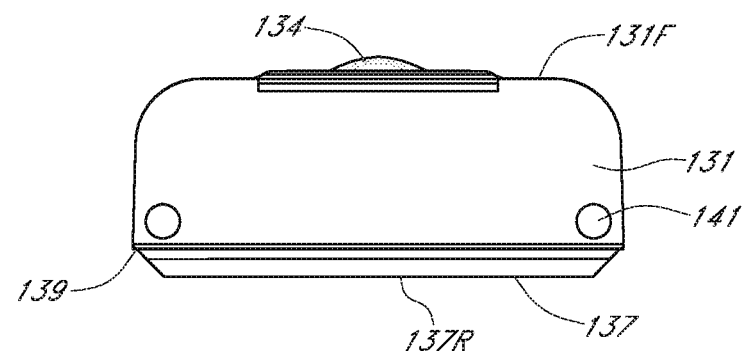

FIGS. 8A and 8B are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 8B, the lower end of the enclosure 131 may include security screw apertures 141 configured to receive screws or other fasteners.

Figure 9A:
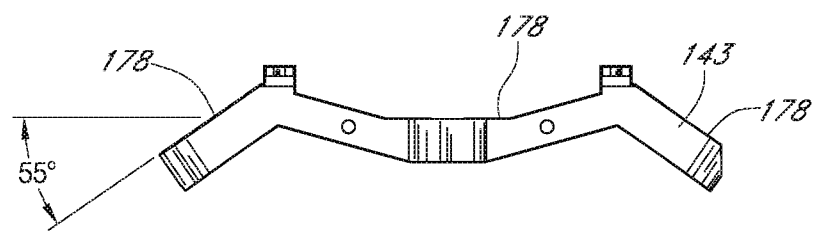
FIGS. 9A and 9B are top and front views, respectively, of a passive infrared sensor holder of the A/V recording and communication doorbell of FIG. 2.

FIG. 9A is a top view of the PIR sensor holder 143. The PIR sensor holder 143 may comprise any suitable material, including, without limitation, metals, metal alloys, or plastics. The PIR sensor holder 143 is configured to mount the PIR sensors 144 behind the lens 132 such that the PIR sensors 144 face out through the lens 132 at varying angles, thereby creating a wide field of view for the PIR sensors 144, and dividing the field of view into zones, as further described below. With further reference to FIG. 9A, the PIR sensor holder 143 includes one or more faces 178 within or on which the PIR sensors 144 may be mounted. In the illustrated embodiment, the PIR sensor holder 143 includes three faces 178, with each of two outer faces 178 angled at 55° with respect to a center one of the faces 178. In alternative embodiments, the angle formed by adjacent ones of the faces 178 may be increased or decreased as desired to alter the field of view of the PIR sensors 144.

Figure 9B:
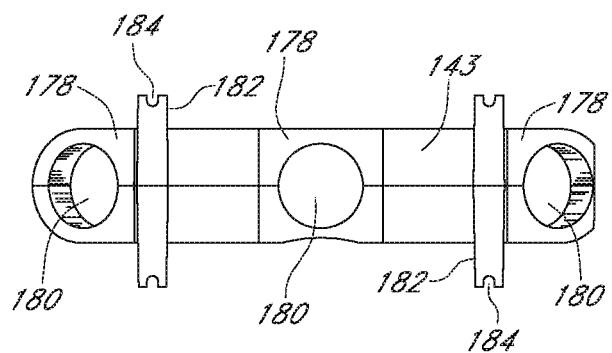

FIG. 9B is a front view of the PIR sensor holder 143. In the illustrated embodiment, each of the faces 178 includes a through hole 180 in which the PIR sensors 144 may be mounted. First and second brackets 182, spaced from one another, extend transversely across the PIR sensor holder 143. Each of the brackets 182 includes notches 184 at either end. The brackets 182 may be used to secure the PIR sensor holder 143 within the doorbell 130. In alternative embodiments, the through holes 180 in the faces 178 may be omitted. For example, the PIR sensors 144 may be mounted directly to the faces 178 without the through holes 180. Generally, the faces 178 may be comprise any structure configured to locate and secure the PIR sensors 144 in place.

Figure 10A:
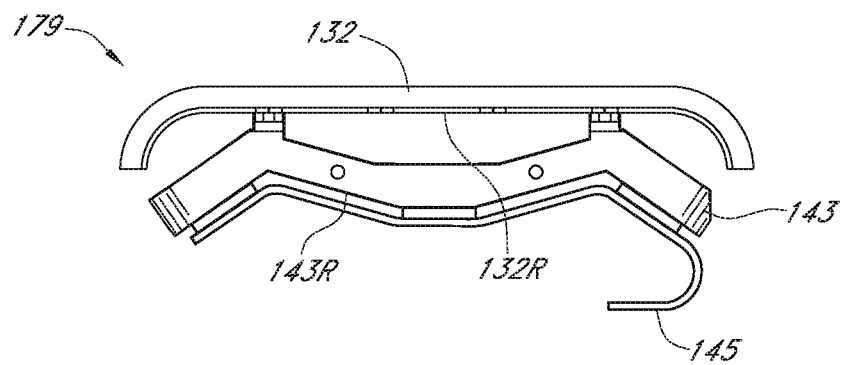
FIGS. 10A and 10B are top and front views, respectively, of a passive infrared sensor holder assembly of the A/V recording and communication doorbell of FIG. 2.
Figure 10B:
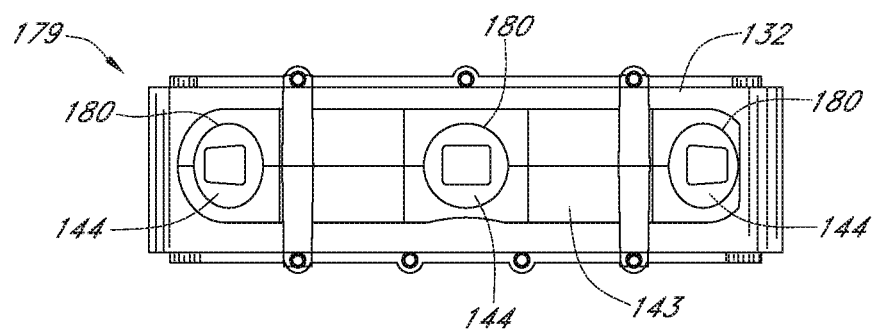

FIGS. 10A and 10B are top and front views, respectively, of a PIR sensor assembly 179, including the PIR sensor holder 143, the lens 132, and a flexible power circuit 145. The PIR sensor holder 143 may be secured to a rear face 132R of the lens 132, as shown, with the brackets 182 abutting the rear face 132R of the lens 132. The flexible power circuit 145, which may be any material or component capable of delivering power and/or data to and from the PIR sensors 144, is secured to a rear face 143R of the PIR sensor holder 143, and may be contoured to match the angular shape of the PIR sensor holder 143. The flexible power circuit 145 may connect to, draw power from, and/or transmit data to and/or from, the power PCB 148 (FIG. 5).

Figure 11:
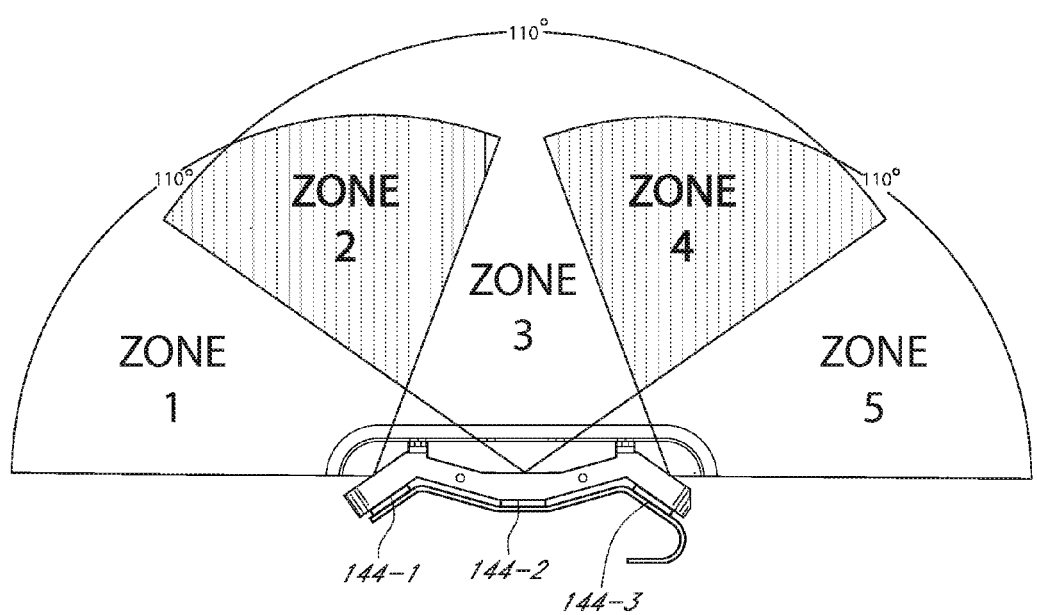
FIG. 11 is a top view of the passive infrared sensor assembly of FIG. 10A and a field of view thereof according to an aspect of the present disclosure.

FIG. 11 is a top view of the PIR sensor assembly 179 illustrating the fields of view of the PIR sensors 144. Each PIR sensor 144 includes a field of view, referred to as a "zone," that traces an angle extending outward from the respective PIR sensor 144. Zone 1 is the area that is visible only to Passive Infrared Sensor 144-1. Zone 2 is the area that is visible only to the PIR sensors 144-1 and 144-2. Zone 3 is the area that is visible only to Passive Infrared Sensor 144-2. Zone 4 is the area that is visible only to the PIR sensors 144-2 and 144-3. Zone 5 is the area that is visible only to Passive Infrared Sensor 144-3. The doorbell 130 may be capable of determining the direction that an object is moving based upon which zones are triggered in a time sequence. In the illustrated embodiment, each zone extends across an angle of 110°. In alternative embodiments, each zone may extend across a different angle, such as one greater than or less than 110°.

Figure 12:
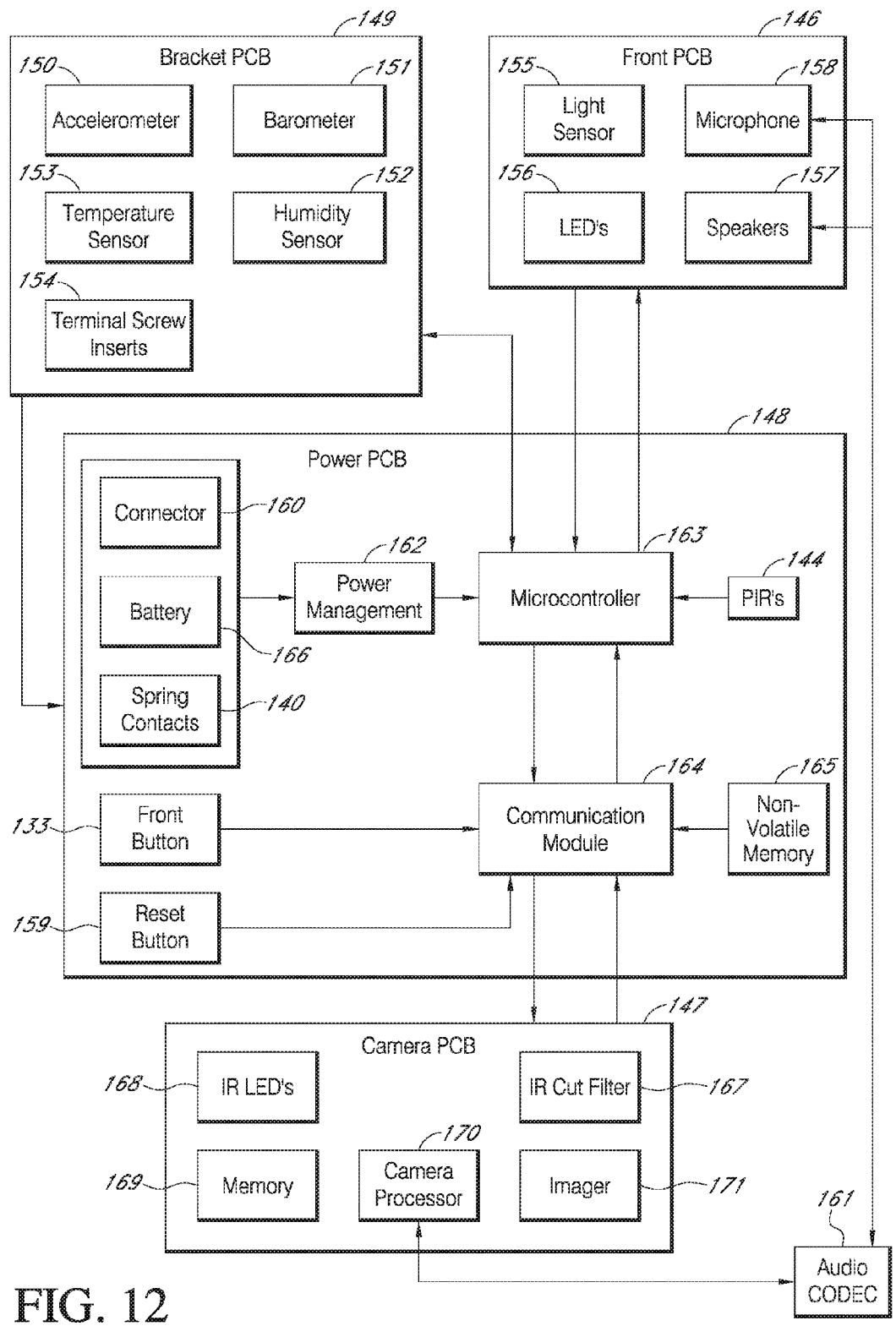
FIG. 12 a functional block diagram of the components of the A/V recording and communication doorbell of FIG. 2.

FIG. 12 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 12, the bracket PCB 149 may further comprise terminal screw inserts 154, which may be configured to receive the terminal screws 138 and transmit power to the electrical contacts 177 on the mounting bracket 137 (FIG. 6). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 12, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electromechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 2). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 12, the power PCB 148 may comprise a power management module 162, a microcontroller 163, the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163.

With further reference to FIG. 12, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions, such as those described below with reference to FIG. 14. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 12, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions, such as those described below with reference to FIG. 13. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 12, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

Figure 13:
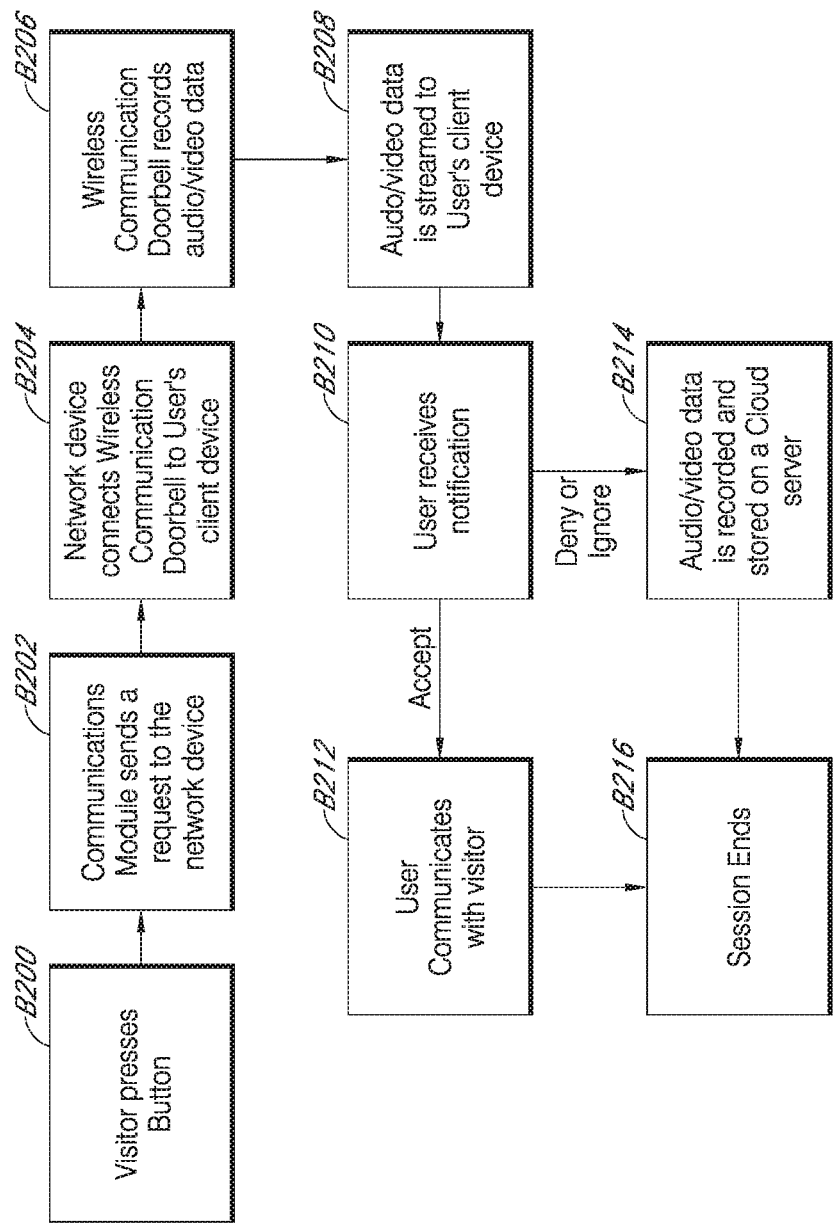
FIG. 13 is a flowchart illustrating a process for an A/V recording and communication doorbell according to an aspect of the present disclosure.

FIG. 13 is a flowchart illustrating one embodiment of a process according to an aspect of the present disclosure. At block B200, a visitor presses the button 133 on the doorbell 130. At block B202, the communication module 164 sends a request to a network device. Once the network device receives the request, at block B204 the network device may connect the doorbell 130 to the user's client device 114 through the user's network 110 and the network 112. In block B206, the doorbell 130 may record available audio and/or video data using the camera 134, the microphone 158, and/or any other sensor available. At block B208, the audio and/or video data is transmitted to the user's client device 114. At block B210, the user may receive a notification on his or her client device 114 prompting him or her to either accept or deny. If the user denies the notification, then the process advances to block B214, where the audio and/or video data is recorded and stored at a cloud server. The session then ends at block B216 and the connection between the doorbell 130 and the user's client device 114 is terminated. If, however, the user elects to accept the notification, then at block B212 the user communicates with the visitor through the user's client device 114 while being provided audio and/or video data captured by the camera 134, the microphone 158, and/or other sensors. At the end of the call, the user may terminate the connection between the user's client device 114 and the doorbell 130 and the session ends at block B216. In some embodiments, the audio and/or video data may be recorded and stored at a cloud server (block B214) even if the user accepts the notification and communicates with the visitor through the user's client device 114.

Figure 14:
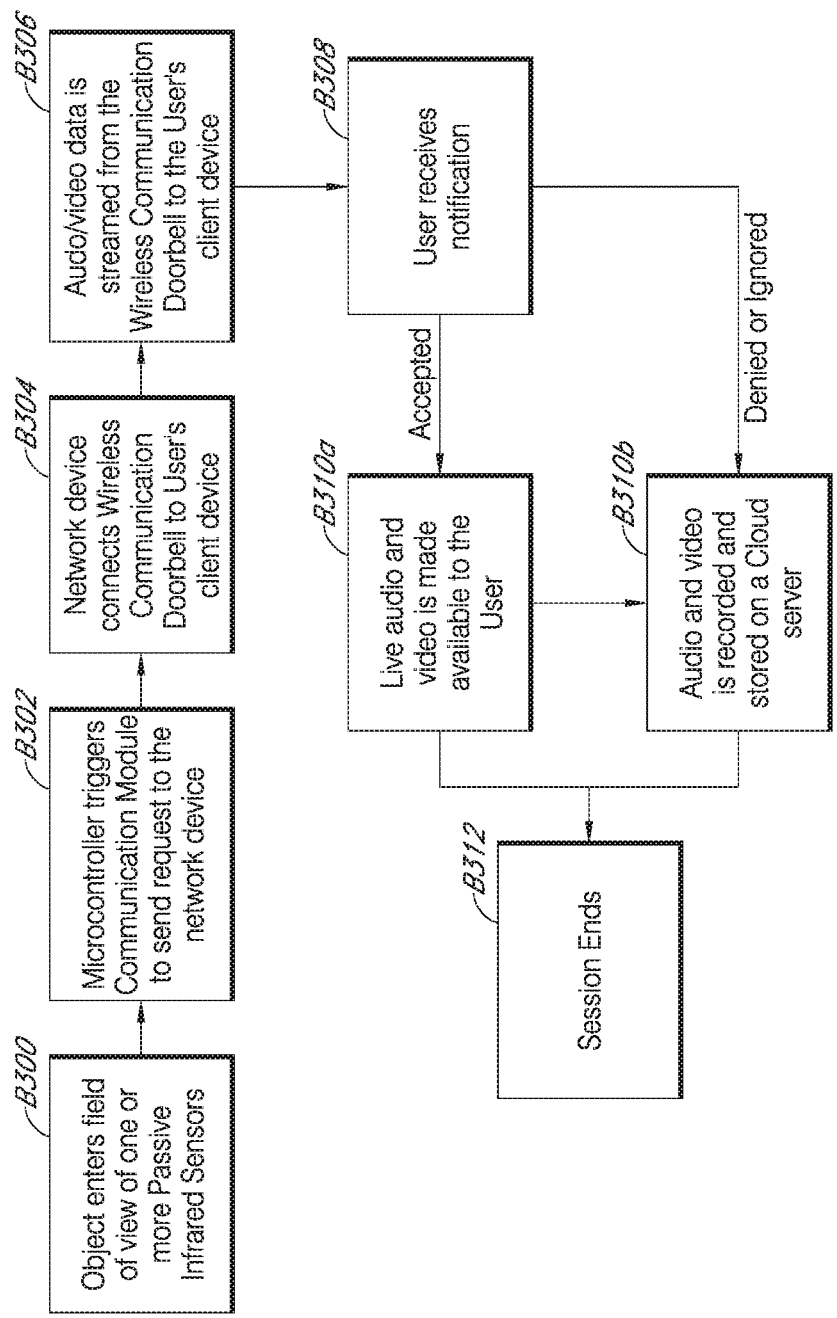
FIG. 14 is a flowchart illustrating another process for an A/V recording and communication doorbell according to an aspect of the present disclosure.

FIG. 14 is a flowchart illustrating another embodiment of a process according to an aspect of the present disclosure. At block B300, an object may move into the field of view of one or more of the PIR sensors 144. At block B302, the PIR sensors 144 may trigger the microcontroller 163, which may then trigger the communication module 164 to send a request to a network device. At block B304, the network device may connect the doorbell 130 to the user's client device 114 through the user's network 110 and the network 112. At block B306, the doorbell 130 may record available audio and/or video data using the camera 134, the microphone 158, and/or any other available sensor, and stream the data to the user's client device 114. At block B308, the user may receive a notification prompting the user to either accept or deny the notification. If the notification is accepted, then at block B310a the live audio/video data may be displayed on the user's client device 114, thereby allowing the user surveillance from the perspective of the doorbell 130. When the user is satisfied with this function, the user may sever the connection at block B312, whereby the session ends. If, however, at block B308 the user denies the notification, or ignores the notification and a specified time interval elapses, then the connection between the doorbell 130 and the user's client device 114 is terminated and the audio/video data is recorded and stored at a cloud server at block B310b, such that the user may view the audio/video data later at their convenience. The doorbell 130 may be configured to record for a specified period of time in the event the notification in block B308 is denied or ignored. If such a time period is set, the doorbell 130 may record data for that period of time before ceasing operation at block B312 thereby ending the session. In some embodiments, the audio and/or video data may be recorded and stored at a cloud server (block B310b) even if the user accepts the notification and communicates with the visitor through the user's client device 114.

Figure 15:
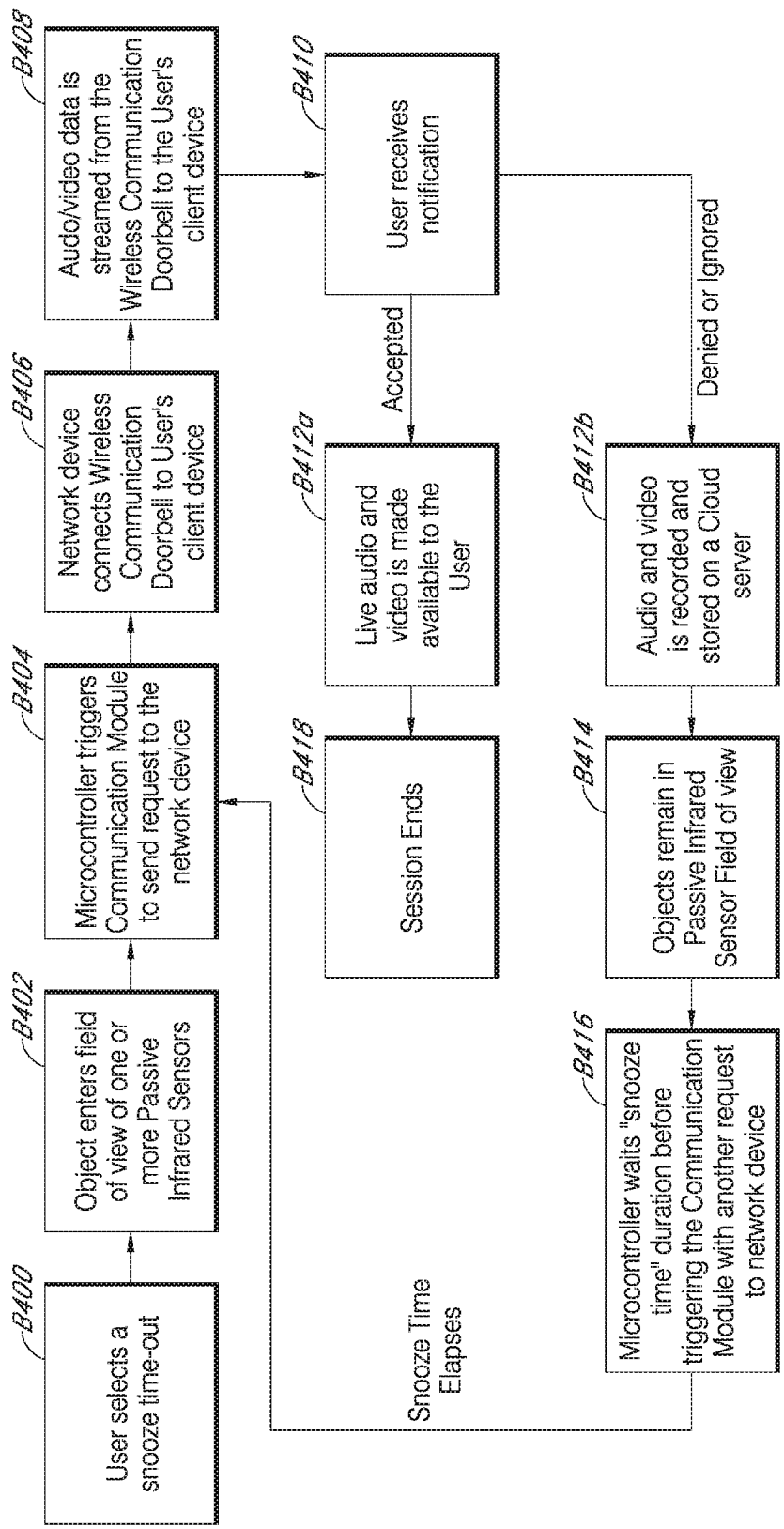
FIG. 15 is a flowchart illustrating another process for an A/V recording and communication doorbell according to an aspect of the present disclosure.

FIG. 15 is a flowchart illustrating another embodiment of a process according to an aspect of the present disclosure. At block B400, the user may select a "snooze time-out," which is a time period during which the doorbell 130 may deactivate or otherwise not respond to stimuli (such as light, sound, or heat signatures) after an operation is performed, e.g. a notification is either accepted or denied/ignored. For example, the user may set a snooze time-out of 15 minutes. At block B402, an object moves into the field of view of one or more of the PIR sensors 144. At block B404, the microcontroller 163 may trigger the communication module 164 to send a request to a network device. In block B406, the network device may connect the doorbell 130 to the user's client device 114 through the user's network 110 and the network 112. At block B408, audio/video data captured by the doorbell 130 may be streamed to the user's client device 114. At block B410, the user may receive a notification prompting the user to either accept or deny/ignore the request. If the request is denied or ignored, then at block B412b audio/video data may be recorded and stored at a cloud server. After the doorbell 130 finishes recording, the objects may remain in the PIR sensor 144 field of view at block B414. In block B416, the microcontroller 163 waits for the "snooze time" to elapse, e.g. 15 minutes, before triggering the communication module 164 to submit another request to the network device. After the snooze time, e.g. 15 minutes, elapses, the process moves back to block B404 and progresses as described above. The cycle may continue like this until the user accepts the notification request at block B410. The process then moves to block B412a, where live audio and/or video data is displayed on the user's client device 114, thereby allowing the user surveillance from the perspective of the doorbell 130. At the user's request, the connection may be severed and the session ends at block B418. At this point the user may elect for the process to revert back to block B416, whereby there may be no further response until the snooze time, e.g. 15 minutes, has elapsed from the end of the previous session, or the user may elect for the process to return to block B402 and receive a notification the next time an object is perceived by one or more of the PIR sensors 144. In some embodiments, the audio and/or video data may be recorded and stored at a cloud server (block B412b) even if the user accepts the notification and communicates with the visitor through the user's client device 114.

Figure 16:
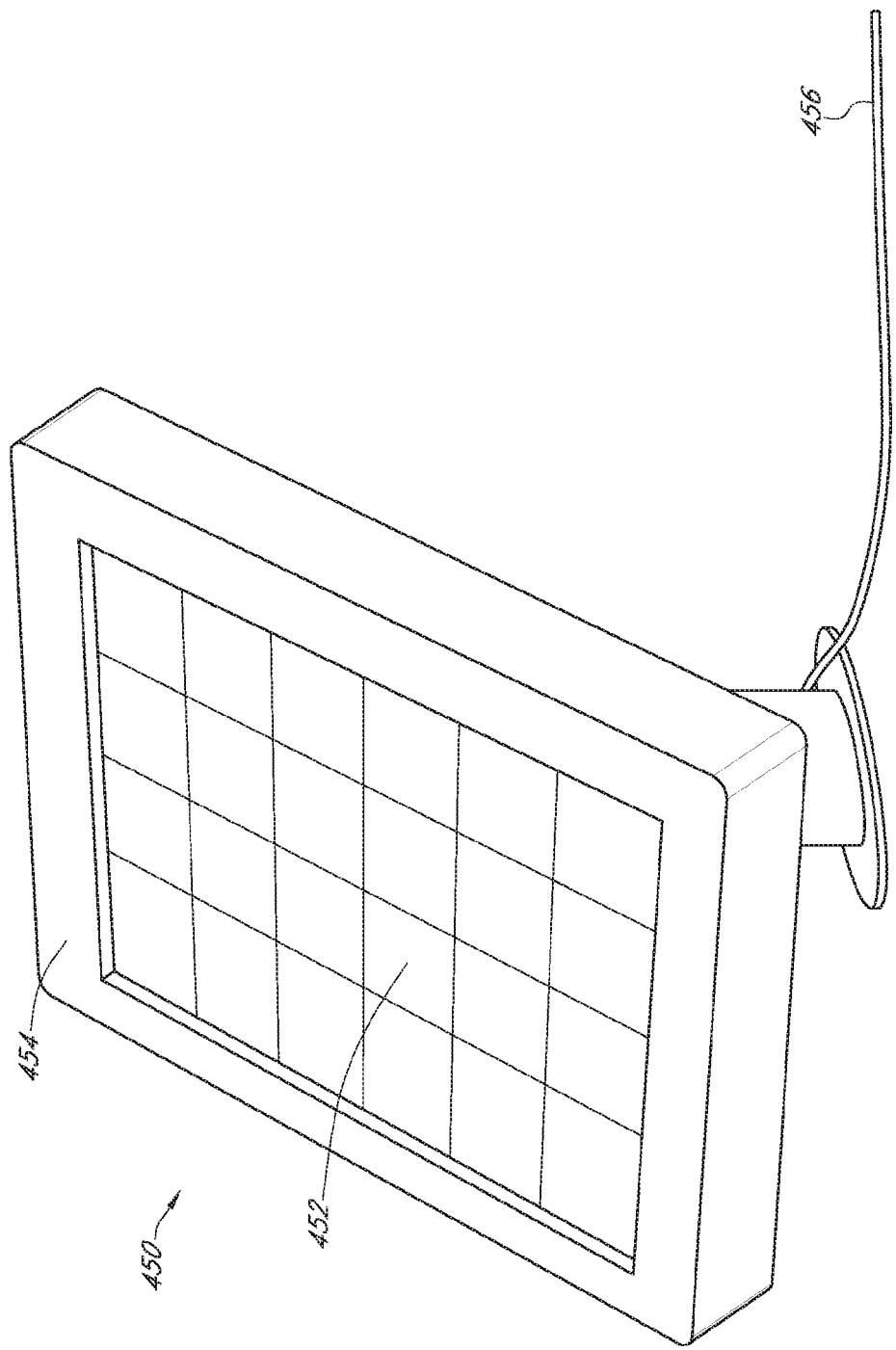
FIG. 16 is a front perspective view of a solar panel configured to provide power to an A/V recording and communication doorbell according to an aspect of the present disclosure.

Some of the present embodiments may include an external solar panel for providing power to the A/V recording and communication device. For example, FIG. 16 illustrates a solar panel 450 comprising a plurality of photovoltaic modules 452 including a packaged, connected assembly of solar cells. The solar modules 452 use light energy (photons) from the sun to generate electricity through the photovoltaic effect. The solar modules 452 may include, for example, wafer-based crystalline silicon cells and/or thin-film cells based on, for example, cadmium telluride or silicon. The solar cells are secured to a structural (load carrying) member 454, and may be rigid or semi-flexible. In one non-limiting example, the total output power of the solar panel 450 may range from about 0.1 watts to about 5 watts, such as from about 0.5 watts to about 1 watt.

The solar panel 450 may include a power cable 456 having a connector (not shown) at a distal end. The connector may comprise, for example, a micro-USB or other connector configured to be received by the connector 160 of the doorbell 130. When the solar panel 450 is connected to the doorbell 130 via the power cable 456 and the connectors, the solar panel 450 may provide power to the doorbell 130 to recharge the battery 166 and/or to power other components of the doorbell 130.

Video on Demand

As described above, one aspect of the present embodiments includes the realization that from time to time it may be advantageous for a user to be able to remotely access the camera of his or her A/V recording and communication device(s). Such functionality would enable the user to observe remotely any events taking place in the field of view of the camera, thereby enhancing the security provided by the A/V recording and communication device(s).

Figure 17:
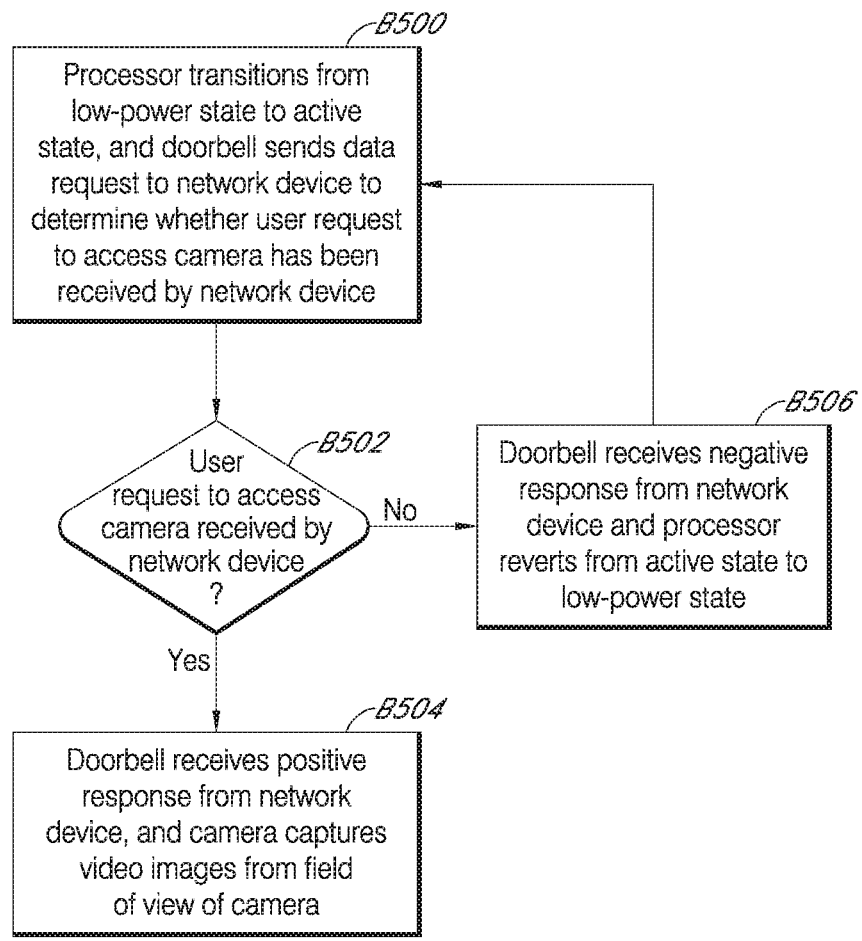
FIG. 17 is a flowchart illustrating another process for an A/V recording and communication device according to an aspect of the present disclosure.

FIG. 17 is a flowchart illustrating another embodiment of a process according to an aspect of the present disclosure. In certain embodiments, the user may be able to initiate a procedure for accessing the camera 134. For example, in the processes described above, the user is only able to view streaming video images from the camera 134 after the doorbell 130 initiates a call with the user's client device 114. In the process illustrated in FIG. 17, by contrast, the user may initiate a call with the doorbell 130, thereby providing the user with "on demand" access to view streaming video images from the camera 134. The ability to view events taking place in the field of view of the camera 134 enhances the functionality of, and the security provided by, the A/V communication doorbell 130. To enable this functionality, however, the present embodiments have solved the issue of how to enable remote access to the camera 134 despite the doorbell 130 being protected behind a network firewall. This solution is described in further detail below.

With reference to FIG. 17, at block B500, the processor transitions from a low-power state to an active state, and the doorbell 130 then sends a data request to a network device to determine whether a user request to access the camera 134 has been received by the network device. The processor may comprise, for example, the communication module 164, and the network device may comprise, for example, a server 118 in the network 112. To send the data request to the server 118, the user may open a software application on his or her client device 114 and select a camera access option, such as by selecting from a menu of commands, or tapping a camera button on the display, etc. The user may then wait for video images from the camera 134 to begin displaying on the display of the client device 114.

In some embodiments, the data request may comprise a Hypertext Transfer Protocol (HTTP) "get," which may be sent from the doorbell 130 to a server 118 in the network 112. HTTP is an application protocol for distributed, collaborative, hypermedia information systems, and is the foundation of data communication for the World Wide Web (Internet). HTTP functions as a request-response protocol in the client-server computing model, and an HTTP session is a sequence of network request-response transactions. An HTTP client initiates a request by establishing a Transmission Control Protocol (TCP) connection to a particular port on a server. An HTTP server listening on that port waits for a client's request message. Upon receiving the request, the server sends back a status line and a message of its own. The body of this message is typically the requested resource, although an error message or other information may also be returned. Further information about HTTP is available in the six-part HTTP/1.1 specification (RFC7230-RFC7235), published in June 2014 by the HTTP Working Group (HTTPbis), which is incorporated herein by reference in its entirety.

With further reference to FIG. 17, at block B502, it is determined whether a user request to access the camera 134 has been received by the network device. This determination may be based on the response that the doorbell 130 receives from the network device. Thus, if the processor (e.g. the communication module 164) receives a positive response from the network device, then it is determined that a user request to access the camera 134 has been received by the network device, and then, at block B504, the camera 134 captures video images from a field of view of the camera 134. If, however, the processor (e.g. the communication module 164) receives a negative response from the network device, then it is determined that no user request to access the camera 134 has been received by the network device, and then, at block B506, the processor reverts from the active state to the low-power state. The process then goes back to block B500 and repeats blocks B500 and B502. In some embodiments, the positive response from the network device may comprise a HTTP 200 status code. Also in some embodiments, the negative response from the network device may comprise a HTTP 404 status code.

As described above with reference to block B500, the processor transitions from a low-power state to an active state. In order to conserve power in the battery 166, the doorbell 130 may be in a low-power state whenever there is no activity in the vicinity of the doorbell (e.g. no motion detected and/or no presses of the button 133). For example, all or substantially all of the components of the doorbell 130 may be powered off when the doorbell 130 is in the low-power state. The communication module 164, however, may periodically transition from the low-power state to the active state in order to communicate with the user's network 110 (such as with a router in the network 110). Without this periodic "check-in" between the doorbell 130 and the router, the router may determine that the doorbell 130 is no longer connected to the network 110, and may therefore deauthenticate the doorbell 130. This periodic router check in may happen according to a preset interval (may be referred to as a "keep-alive" interval), such as every 45 seconds.

For the present video on demand processes, however, a check-in interval of 45 seconds may create undesirable latency (e.g. the user would have to wait a long time before video images would first appear on the client device 114). Further, the check-in between the doorbell 130 and the router may not include any communication between the doorbell 130 and the network 112. Still further, the user may not be able to directly access the camera 134 using the client device 114, because the doorbell 130 may be behind a firewall. The present embodiments solve all of these problems by causing the doorbell 130 to periodically communicate with the network 112 according to a preset interval, where the preset interval is shorter than the preset interval for the periodic check-in between the doorbell 130 and the router in the user's network 110.

Thus, in the present embodiments, the user, through a software application running on the client device 114, makes a request to the network 112 to access the camera 134. That request is stored at the network device (e.g. the server 118) until the next time the doorbell 130 communicates with the network 112. Then, after the preset interval elapses, the communication module 164 sends a request to the network 112 to check whether any user requests to access the camera 134 have been received. If no user request has been received, the network device (e.g. the server 118) responds in the negative and the communication module 164 reverts to the low-power state. If, however, a user request has been received, the network device (e.g. the server 118) responds in the affirmative and the communication module 164 notifies the camera 134, which then begins capturing video images. In one non-limiting example, the preset interval for the periodic communication between the communication module 164 and the network device may be 10 seconds. As further described below, however, the length of the preset interval may be adjusted upward or downward in order to balance the competing interests of reducing latency (e.g. reducing the delay that the user may experience when trying to access the camera 134) and conserving battery life.

If the communication module 164 receives the negative response from the network device and reverts to the low-power state, then the communication module 164 waits for the preset interval to elapse again, and then again transitions from the low-power state to the active state and the doorbell 130 sends another data request to the network device to determine whether a user request to access the camera 134 has been received by the network device. This process may repeat until the communication module 164 receives a positive response from the network device. Also, if the communication module 164 receives a positive response from the network device and the camera 134 begins capturing video images, the doorbell 130 may also transmit the video images to the network 112, which may then route the video images to the client device 114. Further, if the communication module 164 receives a positive response from the network device and the camera 134 begins capturing video images, the camera 134 may power up from a dormant state or powered-off state prior to capturing the video images from the field of view of the camera 134.

As described above, the present embodiments advantageously enable a user to initiate access to the camera 134 of the A/V communication doorbell 130. By enabling the user to send an access request to the network 112, and by enabling the doorbell 130 to periodically check with the network 112 to see if any user access requests have been received, the present embodiments solve the issues of reducing latency and enabling the user to access the camera 134 despite the fact that the doorbell 130 may be behind a network firewall.

As described above, the length of the preset interval (the interval between instances of the doorbell 130 sending a request to the network 112 to check whether any user requests to access the camera 134 have been received) may be adjusted upward or downward in order to balance the competing interests of reducing latency (e.g. reducing the delay that the user may experience when trying to access the camera 134) and conserving battery life. If the preset interval is relatively short, the user will experience less latency when accessing the camera 134 because the doorbell 130 will check more frequently whether any user requests to access the camera 134 have been received, but the battery 134 will drain more rapidly because the communication module 164 will transition from the low-power state to the active state more frequently. Conversely, if the preset interval is relatively long, the user will experience more latency when accessing the camera 134 because the doorbell 130 will check less frequently whether any user requests to access the camera 134 have been received, but the battery 134 will drain less rapidly because the communication module 164 will transition from the low-power state to the active state less frequently. The present embodiments advantageously balance these competing interests by initially setting the length of the preset interval to be relatively short to reduce latency, but automatically increasing the length of the preset interval as the battery charge is depleted, thereby extending battery life. And, the present embodiments also advantageously enable the length of the preset interval to be increased after the battery is recharged, thereby reducing latency.

Figure 18:
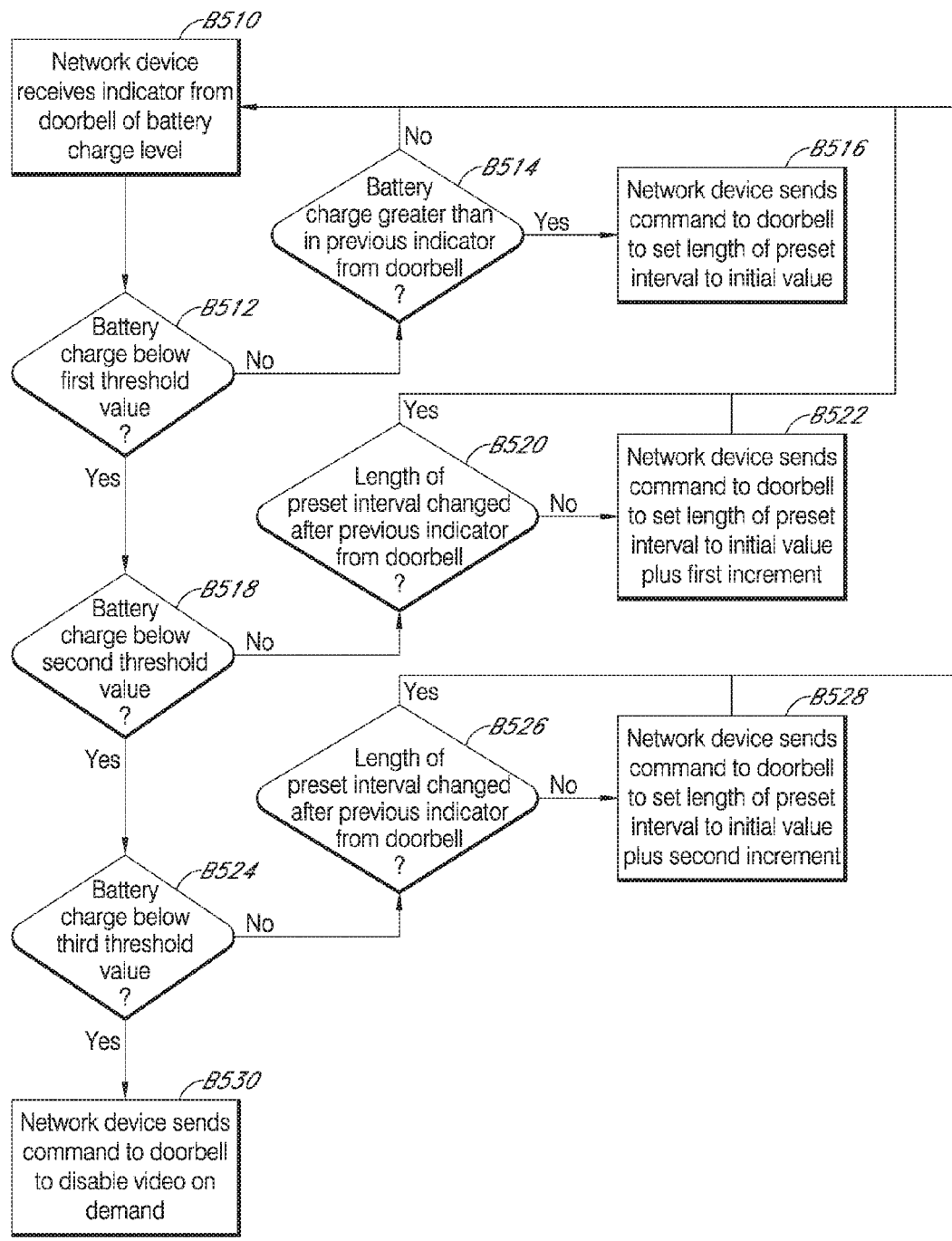
FIG. 18 is a flowchart illustrating another process for an A/V recording and communication device according to an aspect of the present disclosure.

For example, with reference to FIG. 18, at block B510, the network device (e.g. the server 118) receives an indicator from the doorbell 130 of the charge level in the battery 166. In some embodiments, the doorbell 130 may send the indicator of the battery charge level to the network device each time the doorbell 130 sends the data request to the network device to determine whether a user request to access the camera 134 has been received by the network device. In other embodiments, the doorbell 130 may send the indicator of the battery charge level to the network device less frequently, such as once per week, once per day, once per hour, etc. The process then moves to block B512, where the network device compares the charge level in the battery 166 to a first threshold value to determine whether the battery charge level is below the first threshold value. If it is determined that the battery charge level is not below the first threshold value, then the process moves to block B514, where the network device determines whether the battery charge level is greater than it was in the previous indicator received from the doorbell 130. The battery charge level might be greater than it was in the previous indicator if, for example, the battery 166 was recharged since the previous indicator was received. If it is determined that the battery charge level is not greater than it was in the previous indicator received from the doorbell 130, then the process returns to block B510. If, however, it is determined at block B514 that the battery charge level is greater than it was in the previous indicator received from the doorbell 130, then the process moves to block B516, where the network device sends a command to the doorbell 130 (and the doorbell 130 receives the command from the network device) to set the length of the preset interval to the initial value. The initial value represents the shortest interval between instances of the doorbell 130 checking with the network device to see if any user requests to access the camera 134 have been received. The length of the preset interval will typically be set to the initial value after the battery 166 has been recharged sufficiently that the battery charge level is greater than the first threshold value. The process then returns to block B510.

Returning to block B512, if it is determined that the battery charge level is below the first threshold value, then the process moves to block B518, where the network device compares the charge level in the battery 166 to a second threshold value to determine whether the battery charge level is below the second threshold value. If it is determined that the battery charge level is not below the second threshold value, then the process moves to block B520, where the network device determines whether the length of the preset interval was changed after the previous indicator was received from the doorbell 130. If it is determined that the length of the preset interval was changed after the previous indicator was received from the doorbell 130, then the process returns to block B510. If, however, it is determined at block B520 that the length of the preset interval was not changed after the previous indicator was received from the doorbell 130, then the process moves to block B522, where the network device sends a command to the doorbell 130 (and the doorbell 130 receives the command from the network device) to set the length of the preset interval to the initial value plus a first increment. The initial value plus the first increment represents a longer interval (compared to the initial value) between instances of the doorbell 130 checking with the network device to see if any user requests to access the camera 134 have been received. The length of the preset interval will typically be set to the initial value plus the first increment after the battery 166 has drained to the point that the battery charge level is lower than the first threshold value but greater than the second threshold value, or after the battery 166 has been recharged sufficiently that the battery charge level is lower than the first threshold value but greater than the second threshold value. The process then returns to block B510.

Returning to block B518, if it is determined that the battery charge level is below the second threshold value, then the process moves to block B524, where the network device compares the charge level in the battery 166 to a third threshold value to determine whether the battery charge level is below the third threshold value. If it is determined that the battery charge level is not below the third threshold value, then the process moves to block B526, where the network device determines whether the length of the preset interval was changed after the previous indicator was received from the doorbell 130. If it is determined that the length of the preset interval was changed after the previous indicator was received from the doorbell 130, then the process returns to block B510. If, however, it is determined at block B526 that the length of the preset interval was not changed after the previous indicator was received from the doorbell 130, then the process moves to block B528, where the network device sends a command to the doorbell 130 (and the doorbell 130 receives the command from the network device) to set the length of the preset interval to the initial value plus a second increment. The initial value plus the second increment represents a longer interval (compared to the initial value, and compared to the initial value plus the first increment) between instances of the doorbell 130 checking with the network device to see if any user requests to access the camera 134 have been received. The length of the preset interval will typically be set to the initial value plus the second increment after the battery 166 has drained to the point that the battery charge level is lower than the second threshold value but greater than the third threshold value, or after the battery 166 has been recharged sufficiently that the battery charge level is lower than the second threshold value but greater than the third threshold value. The process then returns to block B510.

Returning to block B524, if it is determined that the battery charge level is below the third threshold value, then the process moves to block B530, where the network device sends a command to the doorbell 130 (and the doorbell 130 receives the command from the network device) to disable the video on demand feature. After the video on demand feature is disabled, the network device will not receive any further indicators from the doorbell 130 of the battery charge level until the battery 166 is recharged. Thus, the doorbell 130 may no longer send data requests to the network device (as described with reference to block B500) after the video on demand feature is disabled. Instead, the doorbell 130 may revert to the periodic router check in (the "keep-alive" interval) described above. The video on demand feature may be re-enabled after the battery 166 has been recharged. For example, the charge level of the battery 166 may be provided to the network device periodically, such as in a routine status report. The doorbell 130 may send such status reports daily, for example. After the battery 166 has been recharged, the next status report will indicate the recharged level of the battery 166, and the network device may subsequently send a command to the doorbell 130 to re-enable the video on demand feature.

The foregoing process advantageously allows the length of the preset interval (the interval between instances of the doorbell 130 sending a request to the network 112 to check whether any user requests to access the camera 134 have been received) to be increased as the charge level of the battery 166 decreases. Thus, as the charge in the battery 166 drains, the doorbell 130 will check less and less frequently with the network device to determine whether any user requests to access the camera 134 have been received. The communication module 164 will therefore transition from the low-power state to the active state less and less frequently, thereby prolonging the life of the battery 166. After the battery 166 is recharged, the process will resume, with the length of the preset interval being set according to the degree to which the battery 166 is recharged. If the battery 166 is fully recharged, the preset interval will be set to the initial value. If the battery 166 is recharged such that the charge level falls between the first and second threshold values, the preset interval will be set to the initial value plus the first increment. If the battery 166 is recharged such that the charge level falls between the second and third threshold values, the preset interval will be set to the initial value plus the second increment.

The first threshold value, the second threshold value, and the third threshold value may be set to any values as desired. In one non-limiting example, the first threshold value may be set to 75% (75% of the battery's maximum capacity), the second threshold value may be set to 50% (50% of the battery's maximum capacity), and the third threshold value may be set to 25% (25% of the battery's maximum capacity). In this example, the length of the preset interval will be increased when the charge level of the battery dips below 75% of the battery's maximum capacity, increased again when the charge level of the battery dips below 50% of the battery's maximum capacity, and the video on demand feature will be disabled when the charge level of the battery dips below 25% of the battery's maximum capacity.

In alternative embodiments, fewer threshold values may be set. For example, if only one threshold value is set, then the flowchart of FIG. 18 may be condensed to eliminate all blocks except blocks B510, B512, and B530. In this alternative embodiment, if it is determined at block B512 that the battery charge level is below the first (and only) threshold value, then the process moves directly to block B530, where the network device sends a command to the doorbell 130 (and the doorbell 130 receives the command from the network device) to disable the video on demand feature. If, however, it is determined at block B512 that the battery charge level is not below the first (and only) threshold value, then the process returns to block B510.

In another example, if only two threshold values are set, then the flowchart of FIG. 18 may be condensed to eliminate blocks B524-B528. In this alternative embodiment, if it is determined at block B518 that the battery charge level is below the second threshold value, then the process moves directly to block B530, where the network device sends a command to the doorbell 130 (and the doorbell 130 receives the command from the network device) to disable the video on demand feature. In still further examples, more than three threshold values may be set, such as four threshold values, five threshold values, six threshold values, etc.

The initial value of the preset interval, as well as the values of the first increment and the second increment, may be set to any values as desired. In one non-limiting example, the initial value of the preset interval may be 10 seconds, and the first and second increments may also be set to 10 seconds. In this example, the length of the preset interval will be set to 20 seconds at block B522, and set to 30 seconds at block B528. In alternative embodiments, the values of the first and second increments may be different from one another. For example, the first increment may be 5 seconds, or 10 seconds, or 15 seconds, (or any other value), and the second increment may be 5 seconds, or 10 seconds, or 15 seconds, (or any other value).

The present embodiments have been described with reference to the doorbell 130 illustrated in FIGS. 2-12. It should be understood, however, that the present embodiments are equally applicable to any A/V recording and communication device that is capable of recording video footage and/or audio and transmitting the recorded video footage and/or audio. In certain embodiments, for example, the A/V recording and communication device may not be a doorbell, but may be, for example, an A/V recording and communication security camera. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

Figure 19:
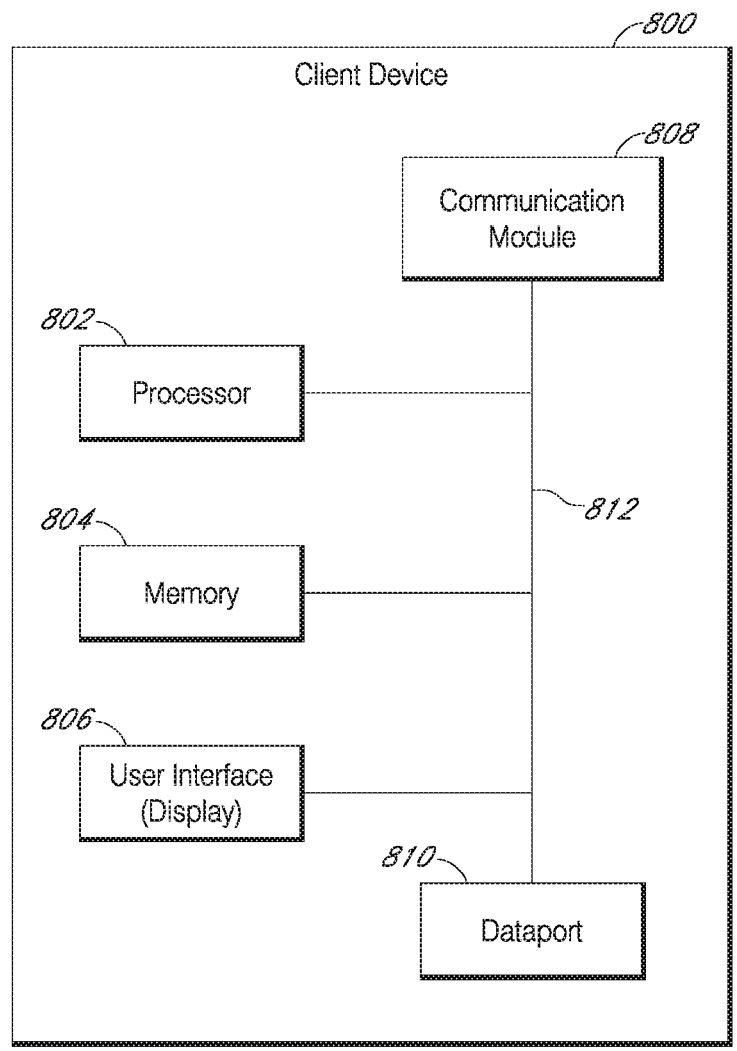
FIG. 19 is a functional block diagram of a client device on which the present embodiments may be implemented according to various aspects of the present disclosure.

FIG. 19 is a functional block diagram of a client device 850 on which the present embodiments may be implemented according to various aspects of the present disclosure. The user's client device 114 described with reference to FIG. 1 may include some or all of the components and/or functionality of the client device 850. The client device 850 may comprise, for example, a smartphone.

With reference to FIG. 19, the client device 850 includes a processor 852, a memory 854, a user interface 856, a communication module 858, and a dataport 860. These components are communicatively coupled together by an interconnect bus 862. The processor 852 may include any processor used in smartphones and/or portable computing devices, such as an ARM processor (a processor based on the RISC (reduced instruction set computer) architecture developed by Advanced RISC Machines (ARM).). In some embodiments, the processor 852 may include one or more other processors, such as one or more conventional microprocessors, and/or one or more supplementary co-processors, such as math co-processors.

The memory 854 may include both operating memory, such as random access memory (RAM), as well as data storage, such as read-only memory (ROM), hard drives, flash memory, or any other suitable memory/storage element. The memory 854 may include removable memory elements, such as a CompactFlash card, a MultiMediaCard (MMC), and/or a Secure Digital (SD) card. In some embodiments, the memory 854 may comprise a combination of magnetic, optical, and/or semiconductor memory, and may include, for example, RAM, ROM, flash drive, and/or a hard disk or drive. The processor 852 and the memory 854 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 852 may be connected to the memory 854 via the dataport 860.

The user interface 856 may include any user interface or presentation elements suitable for a smartphone and/or a portable computing device, such as a keypad, a display screen, a touchscreen, a microphone, and a speaker. The communication module 858 is configured to handle communication links between the client device 850 and other, external devices or receivers, and to route incoming/outgoing data appropriately. For example, inbound data from the dataport 860 may be routed through the communication module 858 before being directed to the processor 852, and outbound data from the processor 852 may be routed through the communication module 858 before being directed to the dataport 860. The communication module 858 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 860 may be any type of connector used for physically interfacing with a smartphone and/or a portable computing device, such as a mini-USB port or an IPHONE®/IPOD® 30-pin connector or LIGHTNING® connector. In other embodiments, the dataport 860 may include multiple communication channels for simultaneous communication with, for example, other processors, servers, and/or client terminals.

The memory 854 may store instructions for communicating with other systems, such as a computer. The memory 854 may store, for example, a program (e.g., computer program code) adapted to direct the processor 852 in accordance with the present embodiments. The instructions also may include program elements, such as an operating system. While execution of sequences of instructions in the program causes the processor 852 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 20:
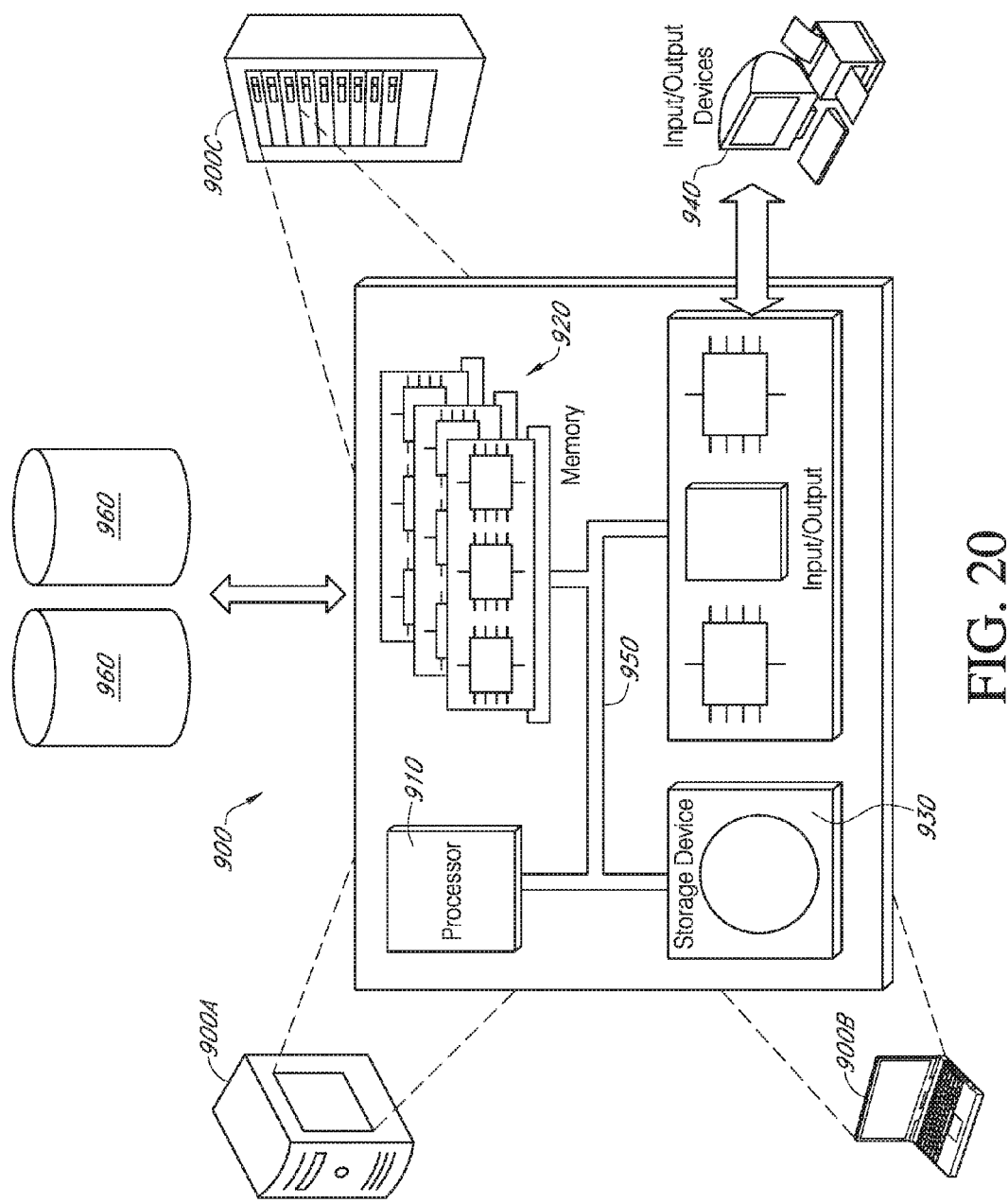
FIG. 20 is a functional block diagram of a general-purpose computing system on which the present embodiments may be implemented according to various aspects of present disclosure.

FIG. 20 is a functional block diagram of a general-purpose computing system on which the present embodiments may be implemented according to various aspects of the present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for an audio/video (A/V) recording and communication device, the device including a processor, a camera, and a battery, the method comprising:

the processor transitioning from a low-power state to an active state, and then sending a data request to a network device to determine whether a user request to access the camera has been received by the network device;

upon determining that a user request to access the camera has been received by the network device, then the processor receiving a positive response from the network device, and then the camera capturing video images from a field of view of the camera;

upon determining that no user request to access the camera has been received by the network device, then the processor receiving a negative response from the network device, and then the processor reverting from the active state to the low-power state, and then waiting for an interval, and then the processor again transitioning from the low-power state to the active state, and then sending another data request to the network device to determine whether a user request to access the camera has been received by the network device; and the processor receiving a command from the network device instructing the processor to increase the length of the interval upon determining that an amount of charge left in the battery is below at least one of a first threshold value and a second threshold value less than the first threshold value, wherein:

the increase in the length of the interval is a first increment when the amount of charge left in the battery is determined to be below the first threshold and above the second threshold; and the increase in the length of the interval is the first increment plus a second increment when the amount of charge left in the battery is determined to be below the second threshold.

2. The method of claim 1, wherein the interval is 10 seconds.

3. The method of claim 1, wherein the command further instructs the processor to decrease the length of the interval upon determining that the amount of charge left in the battery is above at least one of the first threshold value and the second threshold value.

4. The method of claim 3, wherein the decrease in the length of the interval corresponds to whether the threshold value is the first threshold value or the second threshold value.

5. The method of claim 1, further comprising, upon determining that a user request to access the camera has been received by the network device, the device transmitting the video images to the network.

6. The method of claim 1, further comprising, upon determining that a user request to access the camera has been received by the network device, the camera powering up from a dormant state or powered-off state prior to capturing the video images from the field of view of the camera.

7. The method of claim 1, wherein the network device is a server.

8. The method of claim 1, wherein the data request is a Hypertext Transfer Protocol (HTTP) get.

9. The method of claim 1, wherein the positive response from the network device comprises a HTTP 200 status code.

10. The method of claim 1, wherein the negative response from the network device comprises a HTTP 404 status code.

11. The method of claim 1, wherein the device is a doorbell.

12. An audio/video (A/V) recording and communication device, comprising:
- a processor;
- a camera; and
- a battery;
- wherein the processor is configured to execute instructions whereby:
  - the processor transitions from a low-power state to an active state, and then sends a data request to a network device to determine whether a user request to access the camera has been received by the network device;
  - upon determining that a user request to access the camera has been received by the network device, then the processor receives a positive response from the network device, and then the camera captures video images from a field of view of the camera;
  - upon determining that no user request to access the camera has been received by the network device, then the processor receives a negative response from the network device, and then the processor reverts from the active state to the low-power state, and then the processor waits for an interval, and then the processor again transitions from the low-power state to the active state, and then sends another data request to the network device to determine whether a user request to access the camera has been received by the network device; and
  - the processor then receives a command from the network device instructing the processor to increase the length of the interval upon determining that an amount of charge left in the battery is below at least one of a first threshold value and a second threshold value less than the first threshold value,
  - wherein the increase in the length of the interval is a first increment when the amount of charge left in the battery is determined to be below the first threshold value but above the second threshold value; and
  - wherein the increase in the length of the interval is the first increment plus a second increment when the amount of charge left in the battery is determined to be below the second threshold value.

13. The device of claim 12, wherein the interval is 10 seconds.

14. The device of claim 12, wherein the command further instructs the processor to decrease the length of the interval upon determining that the amount of charge left in the battery is above at least one of the first threshold value and the second threshold value.

15. The method of claim 14, wherein the decrease in the length of the interval is greater when the amount of charge left in the battery is determined to be above the first threshold value than when the amount of charge left in the battery is determined to be above the second threshold value but below the first threshold value.

16. The device of claim 12, wherein the processor is further configured to execute instructions whereby, upon determining that a user request to access the camera has been received by the network device, the device transmits the video images to the network.

17. The device of claim 12, wherein the processor is further configured to execute instructions whereby, upon determining that a user request to access the camera has been received by the network device, the camera powers up from a dormant state or powered-off state prior to capturing the video images from the field of view of the camera.

18. The device of claim 12, wherein the network device is a server.

19. The device of claim 12, wherein the data request is a Hypertext Transfer Protocol (HTTP) get.

20. The device of claim 12, wherein the positive response from the network device comprises a HTTP 200 status code.

21. The device of claim 12, wherein the negative response from the network device comprises a HTTP 404 status code.

22. The device of claim 12, wherein the device is a doorbell.

* * * * *